United States Patent
Yang

(10) Patent No.: US 12,538,149 B2
(45) Date of Patent: Jan. 27, 2026

(54) BEAM FAILURE RECOVERY METHOD AND APPARATUS, AND DEVICE

(71) Applicant: VIVO MOBILE COMMUNICATION CO., LTD., Guangdong (CN)

(72) Inventor: Yu Yang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 532 days.

(21) Appl. No.: 18/060,898

(22) Filed: Dec. 1, 2022

(65) Prior Publication Data

US 2023/0095844 A1 Mar. 30, 2023

Related U.S. Application Data

(63) Continuation of application No. PCT/CN2021/097657, filed on Jun. 1, 2021.

(30) Foreign Application Priority Data

Jun. 2, 2020 (CN) .......................... 202010491231.2

(51) Int. Cl.
H04W 24/08 (2009.01)
H04L 5/00 (2006.01)

(52) U.S. Cl.
CPC ........... *H04W 24/08* (2013.01); *H04L 5/0048* (2013.01)

(58) Field of Classification Search
CPC .... H04W 24/08; H04L 5/0048; H04L 5/0051; H04L 1/1845; H04B 7/06968; H04B 7/06964; H04B 7/0695; H04B 7/088; H04B 7/06952

See application file for complete search history.

(56) References Cited

U.S. PATENT DOCUMENTS 11,546,197 B2 * 1/2023 Yamada ................ H04L 1/1896
11,647,404 B2 * 5/2023 Ji ........................ H04B 7/06964
370/225
2017/0048736 A1 2/2017 Marinier et al.
(Continued)

FOREIGN PATENT DOCUMENTS

CN 110034799 A 7/2019
CN 110324900 A 10/2019
(Continued)

OTHER PUBLICATIONS

Vivo "Remaining issues on search space design" 3GPP T-SG RAN WG1 Meeting #90bis, Prague, Czech Republic, Oct. 2017, R1-1717484, 9 Pages. (Year: 2017).*

(Continued)

*Primary Examiner* — Ayaz R Sheikh
*Assistant Examiner* — Louis Samara
(74) *Attorney, Agent, or Firm* — BROOKS KUSHMAN P.C.

(57) ABSTRACT

A beam failure recovery method and apparatus, and a device. The method includes: determining, based on a measurement result of a target reference signal corresponding to a target physical downlink control channel PDCCH, whether a beam failure event occurs, where the target PDCCH includes at least a first PDCCH repeatedly transmitted for K times, and K≥2; and reporting a beam failure recovery request to a network-side device.

17 Claims, 7 Drawing Sheets

UE determines, based on a measurement result of a target reference signal corresponding to a target PDCCH, whether a beam failure event occurs — 201

The UE reports a beam failure recovery request to a network-side device — 202

(56) References Cited

U.S. PATENT DOCUMENTS

| | | | |
|---|---|---|---|
| 2019/0149412 A1 | 5/2019 | Kazmi et al. | |
| 2019/0260527 A1* | 8/2019 | Wu | H04L 5/0051 |
| 2019/0274098 A1* | 9/2019 | Cheng | H04L 5/0025 |
| 2020/0035249 A1 | 1/2020 | Choi et al. | |
| 2020/0045709 A1 | 2/2020 | Seo et al. | |
| 2020/0100219 A1* | 3/2020 | Takeda | H04W 72/23 |
| 2020/0137821 A1 | 4/2020 | Cirik et al. | |
| 2020/0196284 A1* | 6/2020 | Wang | H04W 72/23 |
| 2020/0221428 A1 | 7/2020 | Moon et al. | |
| 2020/0260416 A1 | 8/2020 | Kim et al. | |
| 2020/0344621 A1 | 10/2020 | Xu et al. | |
| 2020/0413395 A1 | 12/2020 | Chen et al. | |
| 2021/0014884 A1 | 1/2021 | Yang et al. | |
| 2021/0058906 A1 | 2/2021 | Seo et al. | |
| 2021/0120574 A1* | 4/2021 | Takeda | H04W 72/23 |
| 2021/0167839 A1 | 6/2021 | Zhang et al. | |
| 2021/0234752 A1 | 7/2021 | Matsumura et al. | |
| 2023/0046074 A1* | 2/2023 | Zhang | H04B 7/06968 |
| 2023/0078059 A1* | 3/2023 | Zhang | H04W 36/0085 370/331 |
| 2023/0198602 A1* | 6/2023 | Zeineddine | H04B 7/088 370/329 |
| 2023/0362950 A1 | 11/2023 | Moon et al. | |

FOREIGN PATENT DOCUMENTS

| | | | | |
|---|---|---|---|---|
| CN | 110612693 A | * | 12/2019 | H04L 1/1845 |
| CN | 110831189 A | | 2/2020 | |
| CN | 110959304 A | | 4/2020 | |
| CN | 111010890 A | | 4/2020 | |
| CN | 112673581 A | | 4/2021 | |
| WO | 2018208059 A1 | | 11/2018 | |
| WO | 2019031850 A1 | | 2/2019 | |
| WO | 2019099659 A1 | | 5/2019 | |
| WO | 2019154267 A1 | | 8/2019 | |
| WO | 2020012594 A1 | | 1/2020 | |
| WO | 2020039823 A1 | | 2/2020 | |
| WO | WO-2020048443 A1 | * | 3/2020 | H04B 7/088 |
| WO | WO-2020166624 A1 | * | 8/2020 | H04B 7/06952 |

OTHER PUBLICATIONS

S.-Y. Lien et al., "3GPP NR Sidelink Transmissions Toward 5G V2X," in IEEE Access, vol. 8, pp. 35368-35382, 2020 (Year: 2020).*

K. Takeda, H. Xu, T. Kim, K. Schober and X. Lin, "Understanding the Heart of the 5G Air Interface: An Overview of Physical Downlink Control Channel for 5G New Radio," in IEEE Communications Standards Magazine, vol. 4, No. 3, pp. 22-29, Sep. 2020 (Year: 2020).*

First Office Action for Indian Application No. 202217077245, dated Feb. 2, 2024, 6 Pages.

First Office Action for Chinese Application No. 202010491231.2, dated Dec. 19, 2023, 17 Pages.

Extended European Search Report for Application No. 21818842.3, dated Oct. 31, 2023, 8 Pages.

Vivo "Remaining issues on search space design" 3GPP T-SG RAN WG1 Meeting #90bis, Prague, Czech Republic, Oct. 2017, R1-1717484, 9 Pages.

First Office Action for Japanese Application No. 2022-574607, dated Dec. 8, 2023, 4 Pages.

Samsung "On Rel. 17 FeMIMO WI" 3GPP TSG RAN WG1 #101, e-Meeting, May 2020, R1-2003918, 12 Pages.

International Search Report and Written Opinion for Application No. PCT/CN2021/097657, dated Aug. 3, 2021, 8 Pages.

First Singaporean Office Action for Singaporean Application No. 11202260781W mailed Jun. 11, 2025. 10 pages.

First Indonesian Office Action for Indonesian Patent Application No. P00202215320 mailed Jan. 6, 2025. 6 pages.

* cited by examiner

BEAM FAILURE RECOVERY METHOD AND APPARATUS, AND DEVICE

CROSS-REFERENCE TO RELATED APPLICATIONS

This application is a continuation application of International Application No. PCT/CN2021/097657 filed on Jun. 1, 2021, which claims priority to Chinese Patent Application No. 202010491231.2, filed on Jun. 2, 2020, which are incorporated herein by reference in their entireties.

TECHNICAL FIELD

This application pertains to the communications field, and in particular, relates to a beam failure recovery method and apparatus, and a device.

BACKGROUND

Currently, in a BFR mechanism, user equipment UE mainly determines a beam failure event by measuring a BFD RS, but the BFD RS is configured by a network and is spatially QCLed with a CORESET (PDCCH). Therefore, a measurement result of the BFD RS can reflect beam quality of the PDCCH.

However, in a related PDCCH transmission process, repeated transmission and reception of the PDCCH are not supported. Therefore, how to implement beam failure recovery in a scenario supporting repeated transmission of the PDCCH is a problem to be resolved in this application.

SUMMARY

An objective of embodiments of this application is to provide a beam failure recovery method and apparatus, and a device.

According to a first aspect, a beam failure recovery method is provided, where the method includes: determining, based on a measurement result of a target reference signal corresponding to a target physical downlink control channel PDCCH, whether a beam failure event occurs, where the target PDCCH includes at least a first PDCCH repeatedly transmitted for K times, and K≥2; and reporting a beam failure recovery request to a network-side device.

According to a second aspect, a beam failure recovery apparatus is provided, where the apparatus includes: a determining module, configured to determine, based on a measurement result of a target reference signal corresponding to a target PDCCH, whether a beam failure event occurs, where the target PDCCH includes at least a first PDCCH repeatedly transmitted for K times, and K≥2; and a sending module, configured to report a beam failure recovery request to a network-side device.

According to a third aspect, a beam failure recovery method is provided, where the method includes: sending indication information to UE, where the indication information indicates a reference signal resource set used for measurement, the reference signal resource set includes a resource of a target reference signal corresponding to a target PDCCH, the target reference signal is used for beam failure detection, the target PDCCH includes at least a first PDCCH repeatedly transmitted for K times, and K≥2; and receiving a beam failure recovery request from the UE.

According to a fourth aspect, a beam failure recovery apparatus is provided, where the apparatus includes: a sending module, configured to send indication information to UE, where the indication information indicates a reference signal resource set used for measurement, the reference signal resource set includes a resource of a target reference signal corresponding to a target PDCCH, the target reference signal is used for beam failure detection, the target PDCCH includes at least a first PDCCH repeatedly transmitted for K times, and K≥2; and a receiving module, configured to receive a beam failure recovery request from the UE.

According to a fifth aspect, a terminal device is provided, where the terminal device includes a processor, a memory, and a program or instructions stored in the memory and capable of running on the processor, where when the program or instructions are executed by the processor, the steps of the method according to the first aspect are implemented.

According to a sixth aspect, a network-side device is provided, where the network-side device includes a processor, a memory, and a program or instructions stored in the memory and capable of running on the processor, where when the program or instructions are executed by the processor, the steps of the method according to the third aspect are implemented.

According to a seventh aspect, a readable storage medium is provided, where the readable storage medium stores a program or instructions, and when the program or instructions are executed by a processor, the steps of the method according to the first aspect or the third aspect are implemented.

According to an eighth aspect, a chip is provided, where the chip includes a processor and a communications interface, the communications interface is coupled to the processor, and the processor is configured to run a program or instructions to implement the method according to the first aspect or the third aspect.

DETAILED DESCRIPTION

Figure 1:
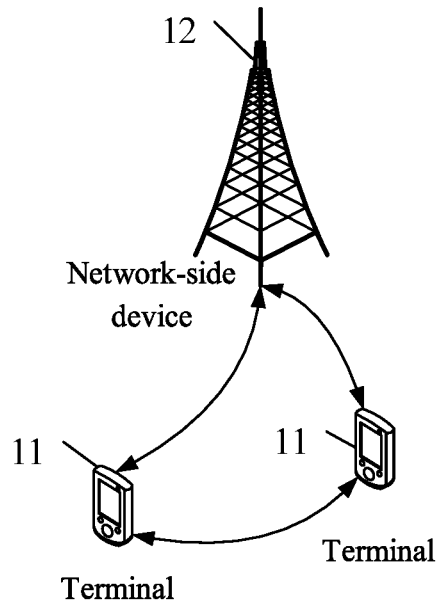
FIG. 1 is a schematic architectural diagram of a communications system to which a solution provided in an embodiment of this application is applied.

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The following describes in detail the terms used in the embodiments of this application.

1. Beam Failure Recovery (BFR) Mechanism for a Primary Cell (Including a PCell or a Primary Secondary Cell PSCell).

In a high frequency band communications system, because a wavelength of a radio signal is short, signal propagation is likely to be blocked, resulting in interruption of signal propagation. If radio link reestablishment in the prior art is used, more time is consumed. Therefore, a BFR mechanism is introduced for the primary cell in 3GPP Release 15 and mainly includes four parts:

Beam failure detection (BFD): UE measures a beam failure detection reference signal (BFD RS) at a physical layer, and determines, based on a measurement result, whether a beam failure event occurs. A determining condition is: if it is detected that measurement results of all BFD RS resources (a hypothetical physical downlink control channel block error rate (hypothetical PDCCH BLER)) are all lower than a preset threshold, a beam failure instance (BFI) is determined. The physical layer of the UE reports an indication to a higher layer (MAC layer) of the UE. The reporting process is periodic. The BFI reporting period is a shortest period of the BFD RS, and a lower bound is 2 ms. Conversely, if the physical layer of the UE determines that no beam failure instance occurs, no indication is sent to the higher layer. The higher layer of the terminal device uses a counter and a timer to count the BFI reported by the physical layer, restarts the timer every time a BFI is received, and resets the counter when the timer expires. When the counter reaches a maximum value configured by a network, the terminal device determines that a beam failure event occurs.

Candidate beam identification: The physical layer of the UE measures a candidate beam reference signal (candidate beam RS or new beam RS) to search for a new candidate beam. This step is not mandatory after the beam failure event occurs, but may alternatively precede the beam failure event, that is, this step may occur at any time. When receiving a request or an indication or a notification from the higher layer (MAC layer) of the terminal device, the physical layer of the terminal device reports a measurement result satisfying a preset condition (measured layer 1-reference signal received power (L1-RSRP) of the candidate beam RS exceeds a preset threshold) to the higher layer of the terminal device, where report content is {RS resource indicator, L1-RSRP}. The higher layer of the terminal device selects a candidate beam based on the report of the physical layer.

Beam failure recovery request (BFRQ): The higher layer (MAC layer) of the UE determines a physical random access channel (PRACH) resource based on a selected target candidate beam. If the UE finds the target candidate beam and a contention-free PRACH resource is configured, the UE sends a BFRQ to a base station by using the contention-free PRACH resource. Otherwise, the UE may use a contention PRACH resource. After a beam failure recovery timer expires, only the contention PRACH resource can be used. The total number of times that the two PRACH resources (the contention-free PRACH resource and the contention-based PRACH resource) are used cannot exceed a preset count.

Beam failure recovery response (BFRR): After receiving the BFRQ, the base station sends a response on a dedicated PDCCH on a configured control resource set-beam failure recovery (CORESET (Control Resource SET)-BFR), where the response carries a cell radio network temporary identifier (C-RNTI). The CORESET-BFR and a reference signal (RS) corresponding to the target candidate beam found by the UE is spatially quasi-co-located (Quasi-Co-Location, QCL).

2. Beam Failure Recovery Mechanism for a Secondary Cell (SCell)

For a multi-carrier scenario (which may be understood as carrier aggregation (CA), where there are a plurality of carriers, or a plurality of component carriers (CC), or a plurality of cells), there is one primary cell (such as a primary cell (PCell) in a master cell group (MCG) or a primary secondary cell (PSCell) in a secondary cell group (SCG)) and at least one secondary cell (SCell).

In 3GPP Release 16, Regarding a Beam Failure Recovery Process of the SCell, the Following Conclusions are Drawn:

(1) BFD

An R15 PCell BFD process is reused to perform beam failure detection on each SCell, where BFD parameters are configured per BWP per cell.

Quantity of BFD RSs: Up to two BFD RSs per BWP.

Explicit configuration of the BFD RS: The BFD RS is located in a current CC.

Implicit configuration of the BFD RS: The BFD RS may be in an active BWP in the current CC or another CC. If more than two CORESETs are configured, according to a UE implementation, the BFD RS(s) is selected based on an RS configured in a transmission configuration indicator TCI state of a CORESET of the active BWP in the current CC.

(2) Candidate Beam (New Candidate Beam)

for New Candidate Beam Configuration:

If SCell BFR is configured, a candidate beam RS needs to be configured; a maximum quantity of candidate beam RSs in each BWP is 64; the candidate beam RS may be based on SSB and CSI-RS for beam management; and the candidate beam RS may be located in a CC for monitoring BFR or located in an active BWP of another CC in a same band.

for a New Candidate Beam Threshold:

A threshold range for candidate beam identification is based on a range specified in RSRP-Range; when SCell BFR is configured and a candidate beam RS is configured, a threshold is always configured for the candidate beam RS; and if one SCell fails, when there is no candidate beam RS whose L1-RSRP is higher than the configured threshold, the UE needs to report identification failure in the SCell.

(3) BFRQ for a BFRQ Process:

If there is an available uplink resource that can be used for new transmission, the uplink resource is used to send a BFR MAC CE;

else if a physical uplink control channel-beam failure recovery (Physical Uplink Control Channel PUCCH-BFR) (or link recovery request (LRR)) is configured, the PUCCH-BFR is sent to request an uplink resource;

else if no PUCCH-BFR is configured or the PUCCH-BFR reaches the maximum number of transmissions, the UE triggers a RACH process similar to that in 3GPP Release 15 (contention-based random access CBRA in a PCell).

for PUCCH-BFR Configuration:

The PUCCH-BFR is configured in a PCell/PSCell. If a PUCCH group is configured, PUCCH-BFR may be configured on a PUCCH-SCell. For the UE, in each PUCCH group, a maximum of one PUCCH-BFR resource can be configured for one BWP, and may be configured as a PUCCH format 0 or a PUCCH format 1.

For a BFR MAC CE:

An uplink grant of any serving cell can be used; and a failed component carrier index (failed CC index) and a candidate beam index (new candidate beam index) are reported. For one SCell, only one beam index is reported.

(4) BFRR

For a PDCCH that schedules a physical uplink shared channel (PUSCH), a downlink control information (DCI) format of the PDCCH uses a same HARQ process number as a PUSCH carrying a BFR MAC CE.

When the UE receives the BFRR, it is considered that a BFR process is complete. For example, a response to the PUCCH-BFR may be a conventional uplink grant that carries a C-RNTI/MC S-C-RNTI.

For other channel beam reconfiguration:

After the UE receives K=28 symbols after the BFRR, the UE uses a new beam when monitoring PDCCHs of all CORESETs in the SCell indicated by the MAC CE.

For the PUCCH, if (PUCCH-spatialRelationInfo (spatial relation information) is configured) and (the PUCCH carrying the LRR is not sent, or is sent in the PCell or PSCell), the new beam is used.

The 28 symbols are based on a minimum SCS of the cell receiving the BFRR and a failed cell.

It should be noted that the beam information, spatial relation information, spatial domain transmission filter information, spatial filter information, TCI state information, QCL information, QCL parameters, spatial relation information, and the like mentioned in the embodiments of this application all have same or similar concepts.

Downlink beam information is usually represented by TCI state information and QCL information. Uplink beam information is usually represented by spatial relation information.

3. Multi-TRP

3GPP Release 16 standardizes a multiple transmission and reception points or multiple antenna panels (multi-TRP/multi-panel) scenario to improve transmission reliability and throughput performance. For example, the UE can receive same data or different data from a plurality of TRPs. Generally, an ideal backhaul and a non-ideal backhaul exist between the plurality of TRPs. For the non-ideal backhaul, there is a long latency in information exchange between the plurality of TRPs, and independent scheduling is more suitable.

Multi-DCI scheduling can be used for the ideal backhaul and the non-ideal backhaul, that is, each TRP sends its own PDCCH, each PDCCH schedules its own PDSCH, and a plurality of CORESETs configured for the UE are associated with different RRC parameters CORESETPoolIndex, corresponding to different TRPs. A plurality of PDSCHs scheduled by multi-DCI may not overlap, partially overlap, or completely overlap on time-frequency resources. On overlapping time-frequency resources, each TRP performs independent precoding based on its own channel, and the UE receives multi-layer data streams belonging to a plurality of PDSCHs in a non-coherent joint transmission (NCJT) mode.

In the ideal backhaul, scheduling information and UE feedback information can be exchanged between the plurality of TRPs in real time. In addition to scheduling the plurality of PDSCHs by using the multi-DCI, the PDSCHs may also be scheduled by using single DCI.

For example, the following transmission schemes may be included:

SDM: Different data layers of a same TB come from NCJT transmission of different TRPs.

FDM: Different frequency domain resources mapped to a same RV on a same TB are sent from different TRPs, or different RVs of a same TB are mapped to different frequency domain resources and sent from different TRPs.

TDM: Different RVs of a same TB come from different TRPs repeatedly for a plurality of times, for example, repeatedly in one slot, or repeatedly in a plurality of slots.

4. Other Terms

The terms "first", "second", and the like in this specification and claims of this application are used to distinguish between similar objects instead of describing a specific order or sequence. It should be understood that the numbers used in this way are interchangeable in appropriate circumstances, so that the embodiments of this application can be implemented in other orders than the order illustrated or described herein. In addition, the term "and/or" in the specification and claims indicates at least one of connected objects, and the character "/" generally represents an "or" relationship between associated objects.

In the related art, a physical layer PDCCH is mainly used for transmitting network control information and scheduling transmission of a downlink or uplink traffic channel.

In a PDCCH design in NR, a CORESET and a search space are introduced. An NR system encapsulates information such as a frequency domain position occupied by a PDCCH in a bandwidth and a quantity of OFDM symbols occupied in time domain in a CORESET, and encapsulates information such as a start OFDM symbol number of the PDCCH and a PDCCH monitoring period in a search space. Generally, one CORESET may be associated with a plurality of search spaces, but one search space can be associated with only one CORESET. Time domain configuration information of a search space set includes a detection period, a slot offset, a quantity of slots, a symbol position, and a CORESET index. Each search space is associated with one CORESET to obtain candidate positions in frequency domain and a quantity of symbols in time domain. In this way, configuration information of the PDCCH can be determined based on the mutually associated CORESET and search space.

The network configures a plurality of candidate TCI states for the CORESET, and activates one of the TCI states by using a MAC CE, that is, the TCI state is used as a TCI state of the CORESET. In addition, a TCI state of the PDCCH is obtained based on the TCI state of the CORESET associated therewith.

In addition, in a related BFR mechanism, the UE determines a beam failure event by measuring a BFD RS, but the BFD RS is configured by the network and is spatially QCLed with a CORESET (PDCCH). In other words, a measurement result of the BFD RS can reflect beam quality of the PDCCH.

However, in a related PDCCH transmission process, repeated transmission and reception of the PDCCH are not supported.

Therefore, when the system supports repeated transmission of the PDCCH, how to measure beam quality of the repeatedly transmitted PDCCH to determine the beam failure event and perform beam failure recovery and in a multi-TRP scenario, when the system supports repeated transmission of the PDCCH, how to measure beam quality of the repeatedly transmitted PDCCH from one or more TRPs to determine the beam failure event and perform beam failure recovery are the problems to be concerned about in this application.

In view of the foregoing problems, the embodiments of this application provide a beam failure recovery method and apparatus, and a device, where the method includes: determining, based on a measurement result of a target reference signal corresponding to a target PDCCH, whether a beam failure event occurs, where the target PDCCH includes at least a first PDCCH repeatedly transmitted for K times, and K≥2; and reporting a beam failure recovery request to a network-side device. In this way, beam failure recovery can be implemented in a scenario supporting repeated transmission of the PDCCH.

It should be noted that the beam failure recovery solution provided in the embodiments of this application may include the following processes in the following order: (1) The network-side device configures a reference signal for measurement for UE; (2) the UE performs measurement and determines the beam failure event; (3) the UE reports the beam failure recovery request to the network-side device; (4) after receiving the request, the network-side device feeds back a beam failure recovery response to the UE; and (5) both the network-side device and the UE reconfigure beam information of a target carrier.

It should be noted that technologies described in the embodiments of this application are not limited to a long time evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, a new radio (NR) system is described for an illustration purpose, and NR terms are used in most of the following descriptions, although these technologies may also be applied to other systems than the NR system, for example, a 6th Generation (6G) communications system.

FIG. 1 is a block diagram of a system architecture of a wireless communications system to which an embodiment of this application may be applied. The wireless communications system includes a terminal 11 and a network-side device 12. The terminal 11 may also be referred to as a terminal device or a user terminal (User Equipment, UE). The terminal 11 may be a terminal-side device such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device, a vehicular device (VUE), or a pedestrian terminal (PUE). The wearable device includes a smart band, an earphone, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art, as long as the same technical effect is achieved. The base station is not limited to specific technical terms. It should be noted that in the embodiments of this application, only a base station in an NR system is used as an example, but a specific type of the base station is not limited.

The beam failure recovery method provided in the embodiments of this application is hereinafter described in detail by using specific embodiments and application scenarios thereof with reference to the accompanying drawings.

Figure 2:
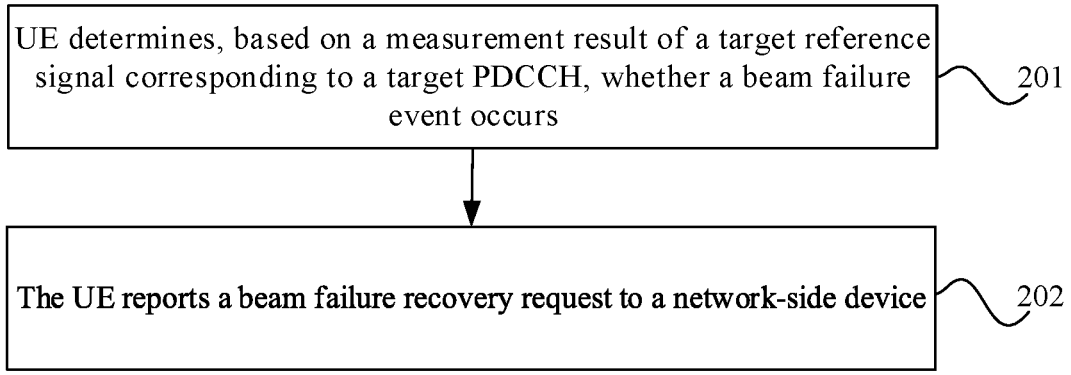
FIG. 2 is a first method flowchart of a beam failure recovery method according to an embodiment of this application.

FIG. 2 is a schematic flowchart of a beam failure recovery method according to an embodiment of this application. As shown in FIG. 2, the beam failure recovery method may include the following steps.

Step 201: UE determines, based on a measurement result of a target reference signal corresponding to a target PDCCH, whether a beam failure event occurs.

Step 202: The UE reports a beam failure recovery request to a network-side device.

In this embodiment of this application, the target PDCCH includes at least a first PDCCH repeatedly transmitted for K times, and K≥2. For example, the first PDCCH may include one PDCCH, or may include a plurality of PDCCHs. This is not limited in this embodiment of this application.

Optionally, in this embodiment of this application, the target PDCCH further includes a second PDCCH, and the second PDCCH is not repeatedly transmitted. It may be understood that the target PDCCH in this embodiment of this application may include only a PDCCH that is repeatedly transmitted, or may include both a PDCCH that is repeatedly transmitted and a PDCCH that is not repeatedly transmitted.

Optionally, in this embodiment of this application, if the UE determines that the beam failure event occurs, the UE may report the beam failure event (beam failure instance) to a higher layer through a physical layer.

The following describes several scenarios to which the beam failure recovery method provided in this embodiment of this application is applied.

Scenario 1 (scenario in which the first PDCCH is repeatedly transmitted by one TRP):

In the scenario 1, the first PDCCH is repeatedly transmitted for K times by one TRP. For example, a PDCCH 1 is repeatedly transmitted for 5 times by a TRP 1.

In an example, the network-side device may directly indicate that the first PDCCH is repeatedly transmitted by one TRP. For example, the network-side device may send indication information to the UE to indicate that the first PDCCH is repeatedly transmitted by one TRP. In this case, configuration information of the PDCCH included in the indication information may satisfy at least one of the following conditions:

i. The configuration information of the PDCCH does not include TRP identification information (such as an RRC parameter CORESETPoolIndex), that is, the network-side device indicates to the UE that a default TRP is used to repeatedly transmit the PDCCH.

ii. The configuration information of the PDCCH includes one piece of TRP identification information, that is, the network-side device indicates to the UE that a TRP configured by the configuration information is used to repeatedly transmit the PDCCH.

iii. The network-side device uses RRC signaling to configure one TCI state for the PDCCH, or the network-side device uses MAC CE signaling to activate one TCI state for the PDCCH. In this case, a same TCI state is used at each time of repeated transmission of the PDCCH.

iv. The network-side device indicates L different TCI states for repeated transmission of the PDCCH, where the L different TCI states may belong to a same CORESET or different CORESETs. For example, if L=K, it indicates that the network-side device indicates a different TCI state for each time of repeated transmission of the PDCCH; or if L<K, it indicates that the network-side device indicates a same TCI state for at least two of all times of repeated transmission of the PDCCH. For example, a TCI state 1 is indicated for first two times of repeated transmission of the PDCCH, and a TCI state 2 is indicated for last three times of repeated transmission.

Scenario 2 (scenario in which the first PDCCH is repeatedly transmitted by a plurality of TRPs):

In the scenario 2, the first PDCCH is repeatedly transmitted for K times by at least two TRPs. For example, a PDCCH 1 is repeatedly transmitted for four times, where the PDCCH 1 is transmitted by a TRP 1, a TRP 2, a TRP 3, and a TRP 4 once separately. Therefore, the PDCCH 1 is repeatedly transmitted for four times in total.

i. The first PDCCH is associated with a plurality of first CORESETs, and TRP identification information corresponding to each of the plurality of CORESETs is different, that is, each CORESET corresponds to one TRP.

1. The plurality of CORESETs have a first association relationship. For example, the PDCCH 1 is associated with a CORESET #1 on the TRP 1, and is further associated with a CORESET #2 on the TRP 2. In this case, the CORESET #1 and the CORESET #2 have the first association relationship.

2. Each first CORESET has an activated TCI state.

3. TCI states of a plurality of associated first CORESETs are used at each time of repeated transmission of the first PDCCH.

ii. The first PDCCH is associated with one second CORESET, and the one second CORESET has a plurality of activated TCI states.

It may be understood that one TCI state of the one associated second CORESET is used at each time of repeated transmission of the first PDCCH, that is, one of a plurality of TCI states of the one associated second CORESET is used at each time of repeated transmission of the first PDCCH. For example, different TCI states are used at each time of repeated transmission of the first PDCCH.

Scenario 3 (scenario in which the first PDCCH is repeatedly transmitted by a plurality of TRPs, and is repeatedly transmitted on at least one TRP):

The scenario 3 is a combination of the scenario 1 and the scenario 2. The first PDCCH is repeatedly transmitted by the plurality of TRPs, and is also repeatedly transmitted on one TRP.

Example 1: The PDCCH 1 is repeatedly transmitted twice on the TRP 1, and is repeatedly transmitted for three times on the TRP 2.

Example 2: The PDCCH 1 is repeatedly transmitted once on the TRP 1, and is repeatedly transmitted for four times on the TRP 2.

It may be understood that a TCI state of at least one associated first CORESET is used at each time of repeated transmission of the first PDCCH, where each CORESET may have at least one TCI state.

(1) In at least one first CORESET, there may be one first CORESET corresponding to one piece of TRP identification information, or there may be a plurality of first CORESETs corresponding to one piece of TRP identification information.

(2) For all or part of the at least one first CORESET, the first CORESET has at least one TCI state. In all TCI states of the first CORESET, there may be one TCI state corresponding to one piece of TRP identification information, or there may be a plurality of TCI states corresponding to one piece of TRP identification information. This is not limited in this embodiment of this application. In this way, each TCI state of the at least one associated first CORESET is used at each time of repeated transmission of the first PDCCH.

In this embodiment of this application, the one first CORESET satisfies at least one of the following:
configuration information of the one first CORESET does not include TRP identification information,
configuration information of the one first CORESET corresponds to one piece of TRP identification information,
at least one piece of TCI state information of the one first CORESET corresponds to same TRP identification information, and
at least one piece of TCI state information of the one first CORESET corresponds to different TRP identification information.

It should be noted that, that at least one piece of TCI state information of the one first CORESET corresponds to same TRP identification information means: each piece of TCI state information of the one first CORESET corresponds to same TRP identification information, or at least two pieces of TCI state information in all TCI state information of the one first CORESET correspond to same TRP identification information. Likewise, that at least one piece of TCI state information of the one first CORESET corresponds to different TRP identification information means: each piece of TCI state information of the one first CORESET corresponds to different TRP identification information, or at least two pieces of TCI state information in all TCI state information of the first CORESET correspond to different TRP identification information.

In this embodiment of this application, in a case that the first PDCCH is associated with N first CORESETs and that each first CORESET has one piece of TCI state information or that a part or all of the N first CORESETs have a plurality of pieces of TCI state information, the N first CORESETs satisfy at least one of the following:
each first CORESET corresponds to different TRP identification information,
each first CORESET corresponds to same TRP identification information,
at least two of the N first CORESETs correspond to different TRP identification information,
at least two of the N first CORESETs correspond to same TRP identification information,
at least one piece of TCI state information corresponding to at least one of the N first CORESETs corresponds to same TRP identification information (that is, a part or all of the TCI state information of a part or all of the N first CORESETs corresponds to same TRP identification information), and
at least one piece of TCI state information corresponding to at least one of the N first CORESETs corresponds to different TRP identification information (that is, a part or all of the TCI state information of a part or all of the N first CORESETs corresponds to different TRP identification information), where
N is a positive integer greater than 1.

It should be noted that the foregoing restrictive conditions that need to be satisfied by the first CORESET may be predefined, or may be agreed in a protocol, or may be configured by the network-side device for the UE (for example, included in the following second predetermined rule and configured for the UE). This is not limited in this embodiment of this application.

Optionally, in this embodiment of this application, before step 201, the beam failure recovery method provided in this embodiment of this application may further include the following step.

Step 301: The UE determines a reference signal resource set used for measurement, where the reference signal resource set includes a resource of the target reference signal.

For example, when the target PDCCH includes a plurality of first PDCCHs, that is, the target PDCCH includes a plurality of repeatedly transmitted PDCCHs, the reference signal resource set used for measurement may include a resource of a reference signal corresponding to each repeatedly transmitted PDCCH.

For example, the reference signal resource set used for measurement may further include another reference signal resource set used for measurement, in addition to the resource of the target reference signal corresponding to the target PDCCH.

For example, the target reference signal may be a BFD RS, or may be another RS. This is not limited in this embodiment of this application.

For example, the reference signal resource set used for measurement may be agreed in a protocol, or may be configured by the network-side device for the UE.

Figure 3:
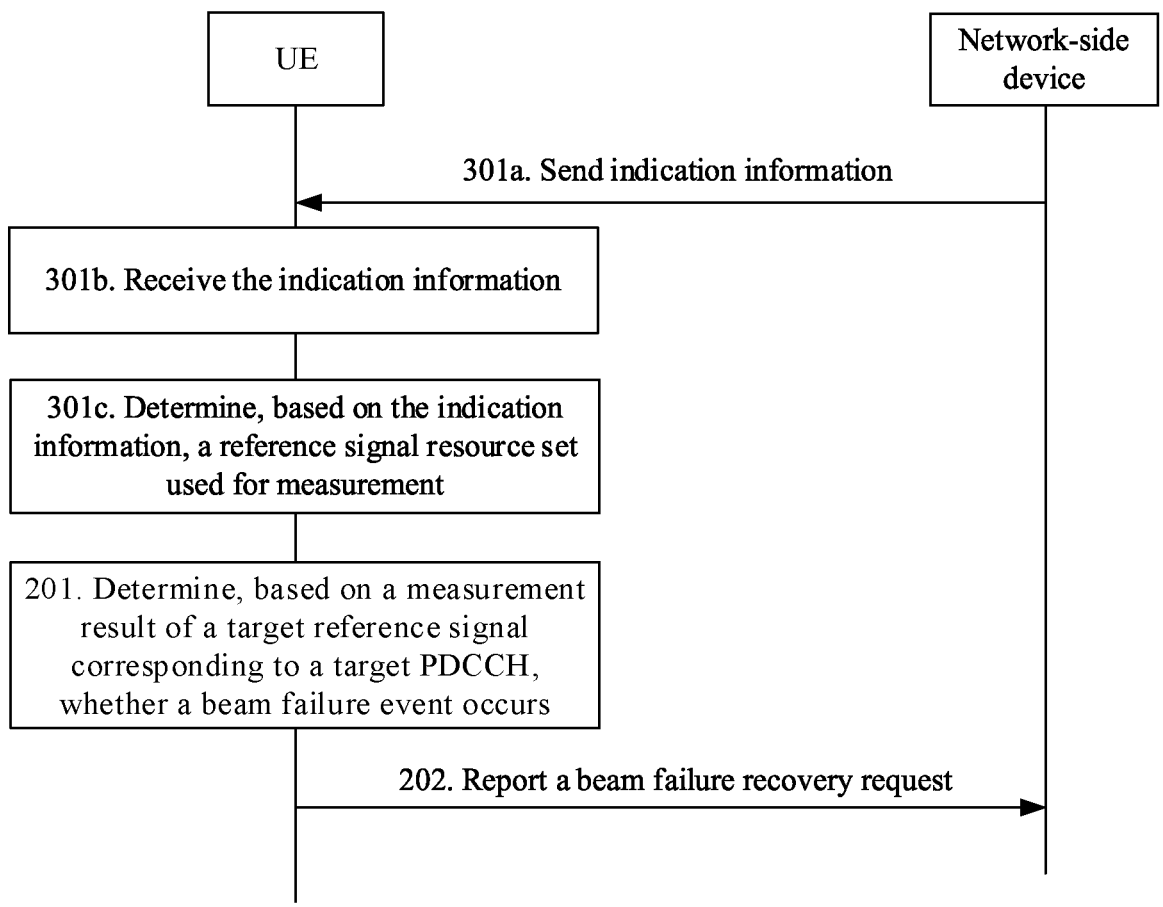
FIG. 3 is a second method flowchart of a beam failure recovery method according to an embodiment of this application.

Optionally, in this embodiment of this application, the network-side device may directly indicate the reference signal resource set used for measurement to the UE. For example, as shown in FIG. 3, before step 301, the beam failure recovery method provided in this embodiment of this application may further include the following steps.

Step 301*a*: The network-side device sends indication information to the UE.

Step 301*b*: The UE receives the indication information from the network-side device.

With reference to the foregoing step 301*a* and step 301*b*, the foregoing step 301 may include the following step 301*c*.

Step 301*c*: The UE determines, based on the indication information, the reference signal resource set used for measurement.

The indication information indicates the reference signal resource set used for measurement; the reference signal resource set includes the resource of the target reference signal; and the target reference signal is used for beam failure detection.

Further optionally, in this embodiment of this application, the foregoing step 301*a* may include the following step 301*a*1.

Step 301*a*1: The network-side device sends the indication information to the UE according to a second predetermined rule.

Further optionally, in this embodiment of this application, the reference signal resource set includes a first reference signal resource group corresponding to the first PDCCH. For example, when the target PDCCH includes a plurality of first PDCCHs, that is, when the target PDCCH includes a plurality of repeatedly transmitted PDCCHs, the reference signal resource set includes a first reference signal resource group corresponding to each first PDCCH, that is, one first PDCCH corresponds to one first reference signal resource group.

Further optionally, in this embodiment of this application, in a case that the target PDCCH further includes a second PDCCH, the reference signal resource set further includes a second reference signal resource corresponding to the second PDCCH.

Further optionally, in this embodiment of this application, the network-side device may directly configure a BFD RS corresponding to the first PDCCH for the UE. For example, for the scenario 1, the BFD RS is QCLed with the first PDCCH.

Further optionally, in this embodiment of this application, reference signal resources in the first reference signal resource group satisfy at least one of the following:

- in a case that the K transmissions of the first PDCCH correspond to K reference signal resources in the first reference signal resource group, and each reference signal resource corresponds to one piece of TCI state information, K pieces of TCI state information corresponding to the K reference signal resources are in a one-to-one correspondence with and the same as K pieces of TCI state information in the K transmissions;
- in a case that the K transmissions of the first PDCCH correspond to one reference signal resource in the first reference signal resource group, and the one reference signal resource corresponds to K pieces of TCI state information, the K pieces of TCI state information corresponding to the one reference signal resource are in a one-to-one correspondence with and the same as K pieces of TCI state information in the K transmissions; and
- in a case that the K transmissions of the first PDCCH correspond to at least one reference signal resource in the first reference signal resource group, and each of the at least one reference signal resource corresponds to at least one piece of TCI state information, all TCI state information corresponding to the at least one reference signal resource is in a one-to-one correspondence with and the same as K pieces of TCI state information in the K transmissions.

It should be noted that the foregoing restrictive conditions that need to be satisfied by the reference signal resources in the first reference signal resource group may be predefined, or may be agreed in a protocol, or may be configured by the network-side device for the UE (for example, included in the foregoing second predetermined rule and configured for the UE). This is not limited in this embodiment of this application.

For example, the K pieces of TCI state information in the K transmissions may include the following content:

- in a case that the first PDCCH is associated with N first CORESETs and that each first CORESET has one piece of TCI state information, the K pieces of TCI state information in the K transmissions include TCI state information of each first CORESET;
- in a case that the first PDCCH is associated with one first CORESET and that the one first CORESET has a plurality of pieces of TCI state information, the K pieces of TCI state information in the K transmissions include each piece of TCI state information of the one first CORESET; or
- in a case that the first PDCCH is associated with N first CORESETs and that at least one of the N first CORESETs has a plurality of pieces of TCI state information, the K pieces of TCI state information in the K transmissions include each piece of TCI state information of each first CORESET.

It should be noted that the foregoing restrictive conditions that need to be satisfied by the K pieces of TCI state information in the K transmissions may be predefined, or may be agreed in a protocol, or may be configured by the network-side device for the UE (for example, included in the foregoing second predetermined rule and configured for the UE). This is not limited in this embodiment of this application.

For example, assuming that the target reference signal is a BFD RS, for the foregoing scenario 1, in a group of BFD RSs corresponding to the first PDCCH, a TCI state of each BFD RS is the same as a TCI state at each time of repeated transmission of the first PDCCH in the scenario 1. For example, a BFD RS resource 1 is QCLed with a first transmission of the first PDCCH, and a BFD RS resource 2 is QCLed with a second transmission of the first PDCCH. For the foregoing scenario 2i, in a group of BFD RSs corresponding to the first PDCCH, each BFD RS resource is QCLed with one of the plurality of first CORESETs having the first association relationship in the scenario 2i. For example, a BFD RS resource 1 is QCLed with the CORESET #1 on the TRP 1, and a BFD RS resource 2 is QCLed with the CORESET #2 on the TRP 2.

For the foregoing scenario 2ii, in a group of BFD RSs corresponding to the first PDCCH, a TCI state of each BFD RS resource is the same as one piece of TCI state information of one second CORESET in the scenario 2ii. For example, TCI state information of a BFD RS resource 1 is the same as information of a first activated TCI state of the second CORESET, and TCI state information of a BFD RS resource 2 is the same as information of a second activated TCI state of the second CORESET.

For the foregoing scenario 3, in a group of BFD RSs corresponding to the first PDCCH, a TCI state of at least one BFD RS resource is the same as one of a part or all of TCI states of at least one of a plurality of first CORESETs having an association relationship. For example, a BFD RS resource 1 is QCLed with the CORESET #1 on the TRP 1, a BFD RS resource 2 is QCLed with the CORESET #2 on the TRP 2, and a BFD RS resource 3 is QCLed with the CORESET #3 on the TRP 2. For another example, a TCI state of a BFD RS resource 1 is the same as a first activated TCI state of the CORESET #1, and the activated TCI state corresponds to the TRP 1; a TCI state of a BFD RS resource 2 is the same as a second activated TCI state of the CORESET #1, and the activated TCI state also corresponds to the TRP 1; and a TCI state of a BFD RS resource 3 is the same as that of the CORESET #2, and the TCI state corresponds to the TRP 2.

Further optionally, in this embodiment of this application, reference signal resources in the first reference signal resource group are source RS resources indicated by TCI state information used in each of the K transmissions of the first PDCCH.

For example, the source RS resources may include at least one of the following:
  in a case that the first PDCCH is associated with N first CORESETs and that each first CORESET has one piece of TCI state information, the source RS resources include a part or all of source RS resources indicated by TCI state information of each first CORESET;
  in a case that the first PDCCH is associated with one first CORESET and that the one first CORESET has a plurality of pieces of TCI state information, the source RS resources include a part or all of source RS resources indicated by each piece of TCI state information of the one first CORESET; or
  in a case that the first PDCCH is associated with N first CORESETs and that at least one of the N first CORESETs has a plurality of pieces of TCI state information, the source RS resources include a part or all of source RS resources indicated by each piece of TCI state information of each first CORESET.

It should be noted that the foregoing restrictive conditions that need to be satisfied by the source RS resources may be predefined, or may be agreed in a protocol, or may be configured by the network-side device for the UE (for example, included in the foregoing second predetermined rule and configured for the UE). This is not limited in this embodiment of this application.

For example, the part of source RS resources include source RS resources indicated by TCI state information satisfying a predetermined condition, where the predetermined condition includes at least one of the following:
  TCI state information indicating mutually different source RSs,
  TCI state information corresponding to a predetermined TCI state identifier (such as a low TCI state ID),
  TCI state information corresponding to different TRP identification information,
  TCI state information whose measurement performance satisfies a predetermined performance condition (such as optimum performance),
  TCI state information of a first CORESET corresponding to different TRP identification information, among the N first CORESETs,
  TCI state information of a first CORESET corresponding to a low CORESET ID, among the N first CORESETs,
  TCI state information of a recently measured first CORESET among the N first CORESETs, and
  TCI state information of a first CORESET whose measurement performance satisfies a predetermined performance condition, among the N first CORESETs.

For example, the predetermined condition may be predefined, or may be agreed in a protocol, or may be configured by the network-side device in advance for the UE. This is not limited in this embodiment of this application.

For example, the TCI state identifier may be a TCI state ID.

For example, for the scenario 1, QCL source RSs in a TCI state of the first PDCCH are used for beam failure detection, or QCL source RSs in a TCI state at each time of repeated transmission of the first PDCCH are used as a group for joint measurement, or QCL source RSs in part of TCI states at each time of repeated transmission of the first PDCCH are selected as a group for joint measurement. A rule for selecting QCL source RSs in the part of TCI states includes at least one of the following: (a) preferentially selecting different QCL source RSs; (b) preferentially selecting a TCI state with a low TCI state ID; (c) preferentially selecting a TCI state closest to a previous measurement time; and (d) preferentially selecting a TCI state with good measurement performance.

For the foregoing scenario 2i, QCL source RSs in the TCI states of the plurality of CORESETs are used as a group for joint measurement; or QCL source RSs in TCI states of part of the plurality of first CORESET are selected as a group for joint measurement. Further, a rule for selecting the part of CORESETs includes at least one of the following: i. among the plurality of first CORESETs, first CORESETs corresponding to same TRP identification information have a second association relationship, and at least one is selected from the first CORESETs having the second association relationship; ii. a first CORESET with a low CORESET-ID is preferentially selected; iii. a first CORESET closest to the previous measurement time is preferentially selected; and iv. a first CORESET with good measurement performance is preferentially selected.

For the scenario 2ii, QCL source RSs in the plurality of TCI states of the one second CORESET are used as a group for joint measurement; or QCL source RSs in part of the plurality of TCI states of the one second CORESET are selected as a group for joint measurement. Further, a rule for selecting the part of TCI states includes at least one of the following: i. the plurality of TCI states of the second CORESET are classified into TCI state groups based on a third association relationship (for example, TCI states corresponding to same TRP identification information have the third association relationship), and at least one TCI state is selected from the TCI states having the third association relationship; ii. a TCI state with a low TCI state ID is preferentially selected; iii. a TCI state closest to the previous measurement time is preferentially selected; and iv. a TCI state with optimum measurement performance is preferentially selected.

For the scenario 3, a TCI state of at least one associated first CORESET is used at each time of repeated transmission of the first PDCCH, where each CORESET may have at least one TCI state. In the scenario 3, QCL source RSs in all TCI states of a plurality of CORESETs associated with the first PDCCH may be used as a group for joint measurement, or QCL source RSs in part of TCI states are selected as a group for joint measurement. A rule for selecting the part of TCI states is the same as the foregoing rule.

Optionally, in this embodiment of this application, after step 201, the beam failure recovery method provided in this embodiment of this application may further include the following step.

Step 302: The UE determines a measurement result of the first reference signal resource group.

Further optionally, in this embodiment of this application, the measurement result of the first reference signal resource group includes at least one of the following:
- a measurement result of each reference signal resource in the first reference signal resource group;
- a joint measurement result obtained by combining measurement results of all of at least one first reference signal resource;
- a measurement result of each of at least one second reference signal resource; and
- a joint measurement result obtained by combining measurement results of all of at least one second reference signal resource.

The at least one first reference signal resource is at least one reference signal resource in the first reference signal resource group; and the at least one second reference signal resource is at least one reference signal resource in the first reference signal resource group, and each second reference signal resource corresponds to one or more pieces of TCI state information. It should be noted that the first reference signal resource may be the same as or different from the second reference signal resource. This is not limited in this embodiment of this application.

For example, the measurement result of each reference signal resource in the first reference signal resource group is a measurement result obtained by separately measuring a reference signal on each reference signal resource in the first reference signal resource group. In other words, a measurement result corresponding to each time of repeated transmission of the first PDCCH is used as a measurement result.

For example, all or part of the at least one second reference signal resource corresponds to one piece of TCI state information. When any second reference signal resource corresponds to one piece of TCI state information, a measurement result obtained when the any second reference signal resource uses the corresponding one piece of TCI state information is a measurement result of the any second reference signal resource.

For example, it is assumed that a group of BFD RSs includes four BFD RS resources: a BFD RS resource 1, a BFD RS resource 2, a BFD RS resource 3, and a BFD RS resource 4. Either of the BFD RS resource 1 and the BFD RS resource 2 corresponds to one TCI state, the BFD RS resource 3 corresponds to two TCI states (a TCI state 1 and a TCI state 2), and the BFD RS resource 4 corresponds to three TCI states (a TCI state 3, a TCI state 4, and a TCI state 5). In this case, a measurement result corresponding to the BFD RS resource 1 and the BFD RS resource 2 is a measurement result when the corresponding TCI state is used. A measurement result corresponding to the BFD RS resource 3 includes at least one of the following: a corresponding measurement result 1 when the BFD RS resource 3 uses the TCI state 1, a corresponding measurement result 2 when the BFD RS resource 3 uses the TCI state 2, and a joint measurement result of the measurement result 1 and the measurement result 2. Likewise, a measurement result corresponding to the BFD RS resource 4 includes at least one of the following: a corresponding measurement result 3 when the BFD RS resource 4 uses the TCI state 3, a corresponding measurement result 4 when the BFD RS resource 4 uses the TCI state 4, a corresponding measurement result 5 when the BFD RS resource 5 uses the TCI state 5, and a joint measurement result of at least two of the measurement result 3, the measurement result 4, and the measurement result 5.

It should be noted that a rule for determining the measurement result of the first reference signal resource group may be agreed in a protocol or may be configured by the network-side device.

For example, in a case that one second reference signal resource corresponds to a plurality of pieces of TCI state information, a measurement result of the one second reference signal resource includes at least one of the following:
- a measurement result when the one second reference signal resource uses each of M pieces of first TCI state information; and
- a joint measurement result obtained by combining measurement results when the one second reference signal resource uses all of M pieces of first TCI state information.

The M pieces of first TCI state information are at least one piece of TCI state information among the plurality of pieces of TCI state information corresponding to the one second reference signal resource, and M is a positive integer.

For example, the M pieces of first TCI state information are TCI state information satisfying a first condition, where the first condition includes all TCI state information corresponding to the one second reference signal resource, or TCI state information corresponding to same TRP identification information, among the plurality of pieces of TCI state information corresponding to the one second reference signal resource.

For example, measurement results corresponding to all or part of repeated transmission of the first PDCCH on all TRPs are combined into a joint measurement result; or joint measurement results corresponding to all or part of TRPs are recombined into a joint measurement result.

For example, the first reference signal resource is a reference signal resource satisfying a second condition, where the second condition includes all reference signal resources in the first reference signal resource group, or reference signal resources corresponding to same TRP identification information, in the first reference signal resource group (that is, all or part of reference signal resources corresponding to a same TRP).

Further optionally, in this embodiment of this application, before step 202, the beam failure recovery method provided in this embodiment of this application may further include the following step.

Step 302a: In a case that the measurement result of the first reference signal resource group satisfies a first preset condition, determine that the beam failure event occurs.

For example, if all measurement results (measurement results of a single transmission and/or a joint measurement result of a plurality of transmissions) corresponding to the measurement result of the first reference signal resource group are less than or equal to a predetermined threshold, it is determined that the beam failure event occurs, or if part of measurement results corresponding to the measurement result of the first reference signal resource group are all less than or equal to a predetermined threshold, it is determined that the beam failure event occurs.

Further optionally, in this embodiment of this application, in a case that the target PDCCH further includes a second PDCCH, before step 202, the beam failure recovery method provided in this embodiment of this application may further include the following step.

Step 302b: In a case that both the measurement result of the first reference signal resource group and a measurement result of a target reference signal resource corresponding to the second PDCCH satisfy a second preset condition, determine that the beam failure event occurs.

For example, when the measurement result corresponding to the repeatedly transmitted first PDCCH (including at least one of the following: a measurement result of each reference signal resource corresponding to the first PDCCH, a measurement result when each reference signal resource uses each TCI state, and various joint measurement results) and a measurement result of the non-repeatedly transmitted second PDCCH (including the measurement result of the reference signal resource corresponding to the second PDCCH) are both less than or equal to a preset threshold, or when a measurement result corresponding to repeated transmission of the first PDCCH and a measurement result of non-repeated transmission of the second PDCCH that are included in the reference signal resource set used for measurement are both less than or equal to a preset threshold, it is determined that the beam failure event occurs.

For example, the higher layer of the UE may determine, based on a counter and/or a timer used for determining beam failure, whether beam failure occurs, that is, in a case that the count in the counter is greater than or equal to a predetermined value and/or that the timer expires, determine that beam failure occurs. The counter and/or timer used for determining beam failure are/is used to count the number of times that a beam failure instance occurs.

It should be noted that the first preset condition and the second preset condition may be agreed in a protocol or may be configured by the network-side device.

Optionally, in this embodiment of this application, the beam failure recovery request includes information of Y third reference signal resources, where the third reference signal resource is used for beam failure recovery; and the Y third reference signal resources are candidate beam reference signal resources satisfying a third condition, in X groups of candidate beam reference signal resources; and each group of candidate beam reference signal resources includes at least one candidate beam reference signal resource, and X and Y are positive integers.

Optionally, in this embodiment of this application, the network-side device may configure at least one group of candidate beam reference signal resources for the UE, where each group of candidate beam reference signal resources includes at least one candidate beam reference signal resource, and the at least one group of candidate beam reference signal resources includes the X groups of candidate beam reference signal resources.

For example, the network-side device may preconfigure the X groups of candidate beam reference signal resources (that is, X groups of candidate beam RS resources) for the UE. In an example, all RS resources in each group of candidate beam RS resources correspond to same TRP identification information. In an example, each group of candidate beam RS resources and the CORESET or each TCI state of the CORESET in each scenario have a fourth association relationship. For example, a group of candidate beam RS resources corresponding to same TRP identification information and at least one CORESET have a fourth association relationship.

Further optionally, in this embodiment of this application, the X groups of candidate beam reference signal resources satisfy at least one of the following: a first resource condition, a second resource condition, and a third resource condition, where the first resource condition includes either of the following: the candidate beam reference signal resource in each group of candidate beam reference signal resources does not correspond to TRP identification information, and the candidate beam reference signal resource in each group of candidate beam reference signal resources corresponds to same TRP identification information;

the second resource condition includes at least one of the following conditions in a case that the first PDCCH is associated with N first CORESETs: the candidate beam reference signal resource in each group of candidate beam reference signal resources does not correspond to TRP identification information; the candidate beam reference signal resource in each group of candidate beam reference signal resources corresponds to same TRP identification information; the candidate beam reference signal resource in each group of candidate beam reference signal resources is associated with at least one of the N first CORESETs; the candidate beam reference signal resource in each group of candidate beam reference signal resources and at least one of the N first CORESETs correspond to same TRP identification information; the candidate beam reference signal resource in each group of candidate beam reference signal resources is associated with at least one piece of TCI state information of at least one of the N first CORESETs; and the candidate beam reference signal resource in each group of candidate beam reference signal resources and at least one piece of TCI state information of at least one of the N first CORESETs correspond to same TRP identification information; and the third resource condition includes at least one of the following conditions in a case that the first PDCCH is associated with one second CORESET: each group of candidate beam reference signal resources is associated with at least one piece of TCI state information of the one second CORESET; and each group of candidate beam reference signal resources and at least one piece of TCI state information of the one second CORESET correspond to same TRP identification information.

Further optionally, in this embodiment of this application, the Y third reference signal resources are: all or part of candidate beam reference signal resources satisfying a fourth condition, in each of at least one group of candidate beam reference signal resources in the X groups of candidate beam reference signal resources; or all or part of candidate beam reference signal resources satisfying a fifth condition, in the X groups of candidate beam reference signal resources, where Y≤X.

For example, the UE may determine the third RS resource (that is, the foregoing third reference signal resource) by measuring the foregoing candidate beam RS resource. In an example, the third RS resource includes an RS resource satisfying a preset condition and selected from each group of candidate beam RS resources (one or more third RS resources may be selected from each group, and the third RS resource depends on a quantity of candidate beam RS resource groups). In another example, the third RS resource includes an RS resource (which may be only one third RS resource, regardless of the quantity of candidate beam RS resource groups) satisfying a preset condition and selected from part of candidate beam RS resource groups. For example, one is selected from RS resources satisfying the preset condition, in each group of candidate beam RS resources as the third RS resource.

Further optionally, in this embodiment of this application, the Y third reference signal resources satisfy at least one of the following: a fourth resource condition, a fifth resource condition, and a sixth resource condition, where the fourth resource condition includes: each third reference signal resource corresponds to one piece of TRP identification information;

the fifth resource condition includes at least one of the following conditions in the case that the first PDCCH is associated with the N first control resource sets CORESETs: each third reference signal resource does not correspond to TRP identification information; each third reference signal resource corresponds to same TRP identification information; each third reference signal resource corresponds to at least one of the N first CORESETs; each third reference signal resource and at least one of the N first CORESETs correspond to same TRP identification information; each third reference signal resource corresponds to at least one piece of TCI state information of at least one of the N first CORESETs; and each third reference signal resource and at least one piece of TCI state information of at least one of the N first CORESETs correspond to same TRP identification information; and the sixth resource condition includes at least one of the following conditions in the case that the first PDCCH is associated with the one second CORESET: each third reference signal resource corresponds to at least one piece of TCI state information of the one second CORESET; and each third reference signal resource and at least one piece of TCI state information of the one second CORESET correspond to same TRP identification information.

It should be noted that the first resource condition and the sixth resource condition may be agreed in a protocol or may be configured by the network-side device.

Further optionally, in this embodiment of this application, the information of the third reference signal resource includes: a candidate beam reference signal resource corresponding to same TRP identification information as a third CORESET, in the X groups of candidate beam reference signal resources; or a candidate beam reference signal resource associated with a third CORESET, in the X groups of candidate beam reference signal resources, where the target PDCCH further includes a second PDCCH, the second PDCCH is not repeatedly transmitted, and the third CORESET is a CORESET corresponding to the second PDCCH.

For example, the third CORESET and one of the N first CORESETs belong to a same TRP.

For example, when the CORESET corresponding to the second PDCCH exists (that is, a CORESET not having the first association relationship exists), the third reference signal resource and the third CORESET correspond to same TRP identification information. For example, a joint measurement result of a CORESET having the first association relationship is good, but a measurement result of a CORESET not having the first association relationship is poor and therefore the UE determines that beam failure occurs. In this case, beam failure recovery needs to be performed on the third CORESET, and the third reference signal resource selected and reported by the UE and the third CORESET correspond to same TRP identification information.

It should be noted that the condition that needs to be satisfied by the third reference signal resource may be agreed in a protocol or may be configured by the network-side device.

Optionally, in this embodiment of this application, the foregoing step 202 may include the following step.

Step 202a: The UE reports the beam failure recovery request to the network-side device by using a target uplink resource.

Further, after step 202a, the beam failure recovery method provided in this embodiment of this application may include the following step 202b.

Step 202b: The network-side device receives the beam failure recovery request from the UE by using the target uplink resource.

The target uplink resource includes a PRACH resource, a resource carrying a MAC CE, or a PUCCH resource.

Further optionally, in this embodiment of this application, in a case of Y≥1, the target uplink resource includes all or part of PRACH resources corresponding to each of the Y third reference signal resources; or in a case of Y=1, the target uplink resource includes one PRACH resource corresponding to the one third reference signal resource.

Further optionally, in this embodiment of this application, before step 202a, the beam failure recovery method provided in this embodiment of this application may include the following steps.

Step 202a1: In a case that the target uplink resource includes a PRACH resource, the UE determines TRP identification information corresponding to the PRACH resource.

Step 202a2: In a case that the target uplink resource includes a PRACH resource, the network-side device determines TRP identification information corresponding to the PRACH resource.

For example, step 202a1 and step 202a2 may include the following content: determining, according to a first predetermined rule, the TRP identification information corresponding to the PRACH resource.

The first predetermined rule includes any one of the following:

the third reference signal resource and the PRACH resource corresponding to the third reference signal resource correspond to same TRP identification information;

the PRACH resource may correspond to preset TRP identification information;

the PRACH resource may correspond to any TRP identification information; and the PRACH resource may correspond to all TRP identification information.

It should be noted that the first predetermined rule may be predefined, or may be agreed in a protocol, or may be configured by the network-side device in advance for the UE. This is not limited in this embodiment of this application.

For example, when there are a plurality of third reference signal resources, a part or all of a plurality of PRACH resources in a one-to-one correspondence with the plurality of third reference signal resources may be used to report the beam failure recovery request. For example, when there are three third reference signal resources (RS resource 1, RS resource 2, and RS resource 3), the RS resource 1 corresponds to a PRACH resource 1, the RS resource 2 corresponds to a PRACH resource 2, and the RS resource 3 corresponds to a PRACH resource 3; or the RS resource 1 and the RS resource 2 correspond to a PRACH resource 1, and the RS resource 3 corresponds to a PRACH resource 3. In this case, a part or all of PRACH resources corresponding to the three RS resources may be used to send the beam failure recovery request. The used PRACH resource and the corresponding RS resource correspond to same TRP identification information.

For example, when there is only one third reference signal resource, one PRACH resource corresponding to the one third reference signal resource is used.

For example, the UE may determine, based on TRP identification information corresponding to a candidate reference signal resource group in which the third reference signal is located, which TRP the PRACH resource is sent to, or determine TRP identification information corresponding to the selected PRACH resource.

Further optionally, in this embodiment of this application, in a case that the target uplink resource includes a resource carrying a MAC CE or a PUCCH resource, the target uplink resource carries at least one of the following information:

the information of the Y third reference signal resources;

identification information of a TRP on which the beam failure event occurs; and

TRP identification information corresponding to the Y third reference signal resources.

Further optionally, in this embodiment of this application, before step 202a, the beam failure recovery method provided in this embodiment of this application may include the following step.

Step 202a2: In a case that the target uplink resource includes a resource carrying a MAC CE, if no uplink grant is available, the UE sends a scheduling request to a target TRP, where the scheduling request is used to request an available uplink grant.

For example, the target TRP is all or part of TRPs corresponding to the Y third reference signal resources, or all TRPs or any TRP configured by the network-side device for the UE.

For example, in the case that the target uplink resource includes a resource carrying a MAC CE, if an uplink grant is available, the UE directly uses the available uplink grant.

Figure 4:
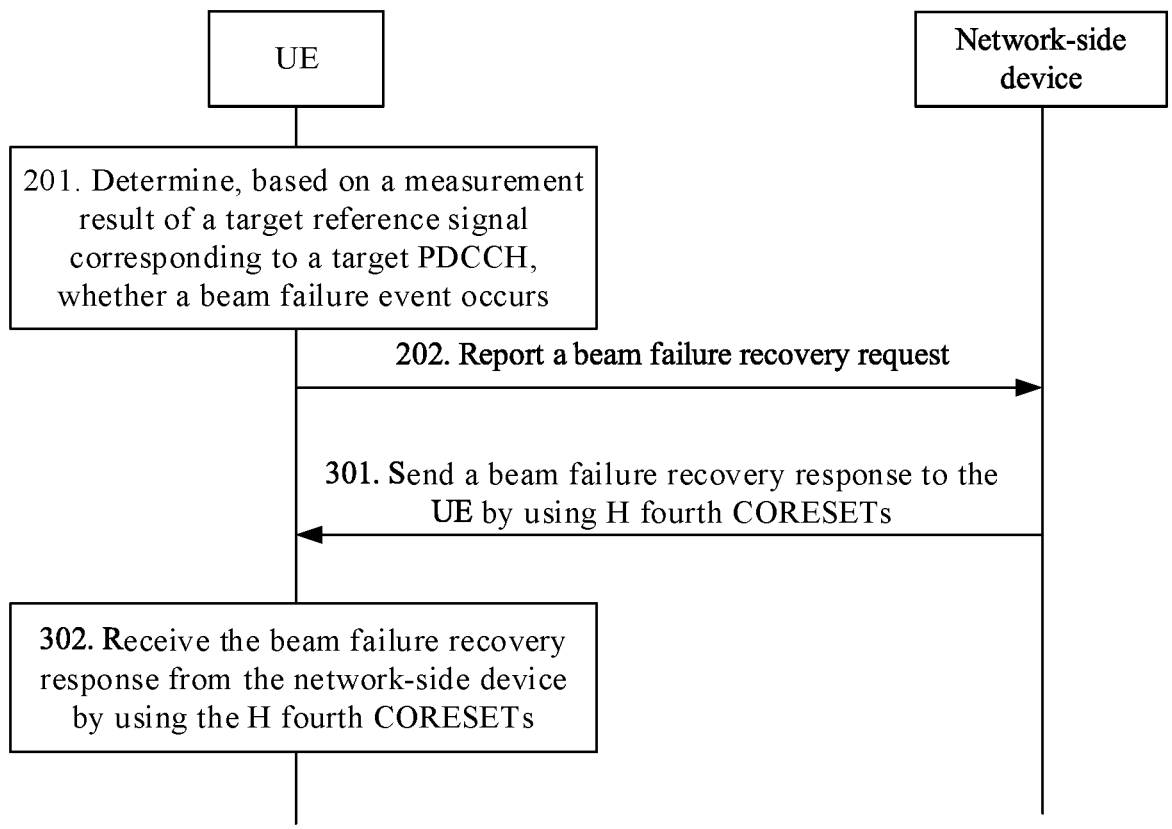
FIG. 4 is a third method flowchart of a beam failure recovery method according to an embodiment of this application.

As shown in FIG. 4, after step 202, the beam failure recovery method provided in this embodiment of this application may further include the following steps.

Step 301: The network-side device sends a beam failure recovery response to the UE by using H fourth CORESETs.

Step 302: The UE receives the beam failure recovery response from the network-side device by using the H fourth CORESETs.

H is a positive integer.

Optionally, in this embodiment of this application, the network-side device may configure at least one fourth CORESET for the UE, where the fourth CORESET is used to carry the beam failure recovery response, and the at least one fourth CORESET includes the H fourth CORESETs. It may be understood that the network-side device may configure at least one CORESET for carrying the beam failure recovery response for the UE, where all or part of fourth CORESETs are used as the fourth CORESETs. Alternatively, the network-side device configures only one CORESET for carrying the beam failure recovery response.

Optionally, in this embodiment of this application, the H fourth CORESETs satisfy at least one of the following:

each of the H fourth CORESETs is in a one-to-one correspondence with and associated with each of the X groups of candidate beam reference signal resources;

TRP identification information corresponding to each of the H fourth CORESETs is in a one-to-one correspondence with and the same as TRP identification information corresponding to each of the X groups of candidate beam reference signal resources;

each of at least one of the H fourth CORESETs is in a one-to-one correspondence with and quasi-co-located QCLed with each of the Y third reference signal resources;

each of at least one of the H fourth CORESETs is in a one-to-one correspondence with and associated with each of the Y third reference signal resources; and TRP identification information corresponding to each of at least one of the H fourth CORESETs is in a one-to-one correspondence with and the same as TRP identification information corresponding to each of the Y third reference signal resources.

For example, when the network-side device may configure at least one CORESET for carrying the beam failure recovery response for the UE, each of the H fourth CORESETs and each group of candidate beam RS resources have a fifth association relationship, that is, H and X are the same. For example, the fourth CORESET having the fifth association relationship and used for carrying the beam failure recovery response and a group of candidate beam RS resources correspond to same TRP identification information, that is, each fourth CORESET and a corresponding candidate beam RS resource group correspond to same TRP identification information.

For example, all or part of the fourth CORESETs are QCLed with each of the reported third reference signal resources. For example, the UE reports two third reference signal resources, and the two third reference signal resources are QCLed with either of the two fourth CORESETs respectively. For another example, the UE reports one third reference signal resource. In this case, only one fourth CORESET is QCLed with the third reference signal resource.

For example, when the network-side device configures one CORESET used for carrying the beam failure recovery response, the UE may monitor the CORESET based on QCL information of the CORESET.

Further optionally, in this embodiment of this application, in a case that H is equal to 1, step 301 may include the following step.

Step 301a: The UE monitors the CORESET based on QCL information of the one fourth CORESET.

The one fourth CORESET satisfies at least one of the following:
  the one fourth CORESET is associated with one of the X groups of candidate beam reference signal resources;
  the one fourth CORESET and one of the X groups of candidate beam reference signal resources correspond to same TRP identification information;
  the one fourth CORESET is quasi-co-located QCLed with one of the Y third reference signal resources;
  the one fourth CORESET is associated with one of the Y third reference signal resources; and
  the one fourth CORESET and one of the Y third reference signal resources correspond to same TRP identification information; and
  the one third reference signal resource may be a third reference signal resource in one group of candidate beam reference signal resources associated with the one fourth CORESET, a third reference signal resource in one group of candidate beam reference signal resources corresponding to same TRP identification information as the one fourth CORESET, or any one of the Y third reference signal resources.

For example, when H=1, the fourth CORESET may satisfy at least one of the following: (1) being associated with one of the X groups of candidate beam reference signal resources; (2) corresponding to a same TRP identifier as one of the X groups of candidate beam reference signal resources; (3) being QCLed with a third RS in the candidate beam reference signal resource group associated in (1) or (2); (4) determining a TCI of the fourth CORESET based on Y third RSs selected in the X groups of candidate beam reference signal resources, for example, randomly selecting one third RS or using all third RSs; and (5) when Y=1, determining a TCI of the fourth CORESET based on the unique third RS.

For example, when the network-side device configures one CORESET used for carrying the beam failure recovery response, the CORESET and one of at least one group of candidate beam RSs have a sixth association relationship. The CORESET is QCLed with a third RS (third reference signal resource) selected by the UE from candidate beam RSs associated with the CORESET. In this way, a monitoring direction of the CORESET can be determined, and the CORESET is monitored.

For example, when the network-side device configures one CORESET used for carrying the beam failure recovery response, the UE may monitor the CORESET based on a TCI state of a third reference signal resource selected from each group of candidate beam RSs. In this way, a plurality of monitoring directions of the CORESET can be determined. In this case, monitoring needs to be performed in all the monitoring directions. For example, the UE may monitor the CORESET in beam directions of all third reference signals.

For example, when the network-side device configures one CORESET used for carrying the beam failure recovery response and Y=1, the CORESET is QCLed with the third reference signal. In this case, the UE may monitor the CORESET based on a TCI state of the third reference signal.

It should be noted that a rule for determining the H fourth CORESETs and the condition that needs to be satisfied by the H fourth CORESETs may be agreed in a protocol or may be configured by the network-side device.

For example, the network-side device may further configure the rule for determining the H fourth CORESETs for the UE. The determining rule is used to indicate that the H fourth CORESETs satisfy any one of the foregoing restrictive conditions on the H fourth CORESETs. Details are not described herein again.

Optionally, in this embodiment of this application, step 301 may include the following step.

Step 301b: The UE monitors the fourth CORESET based on TCI state information of a target third reference signal resource.

The target third reference signal resource is at least one of the Y third reference signal resources.

Further optionally, in this embodiment of this application, the target third reference signal resource satisfies at least one of the following:
  all or part of the Y third reference signal resources;
  a reference signal resource with best signal quality among the Y third reference signal resources;
  a third reference signal resource corresponding to a candidate beam reference signal resource group having a preset group identifier, among the Y third reference signal resources; and
  a third reference signal resource corresponding to a preset resource index, among the Y third reference signal resources.

For example, the determining rule agreed in a protocol or determined based on configuration information of the network-side device may be further used to instruct the UE to monitor the fourth CORESET based on the TCI state information of the target third reference signal resource; and the determining rule is further used to indicate that the target third reference signal resource needs to satisfy at least one of the following:
  all or part of the Y third reference signal resources;
  a reference signal resource with best signal quality among the Y third reference signal resources;
  a third reference signal resource corresponding to a candidate beam reference signal resource group having a preset group identifier, among the Y third reference signal resources; and
  a third reference signal resource corresponding to a preset resource index, among the Y third reference signal resources.

It should be noted that the condition that needs to be satisfied by the target third reference signal resource may be agreed in a protocol or may be configured by the network-side device.

Figure 5:
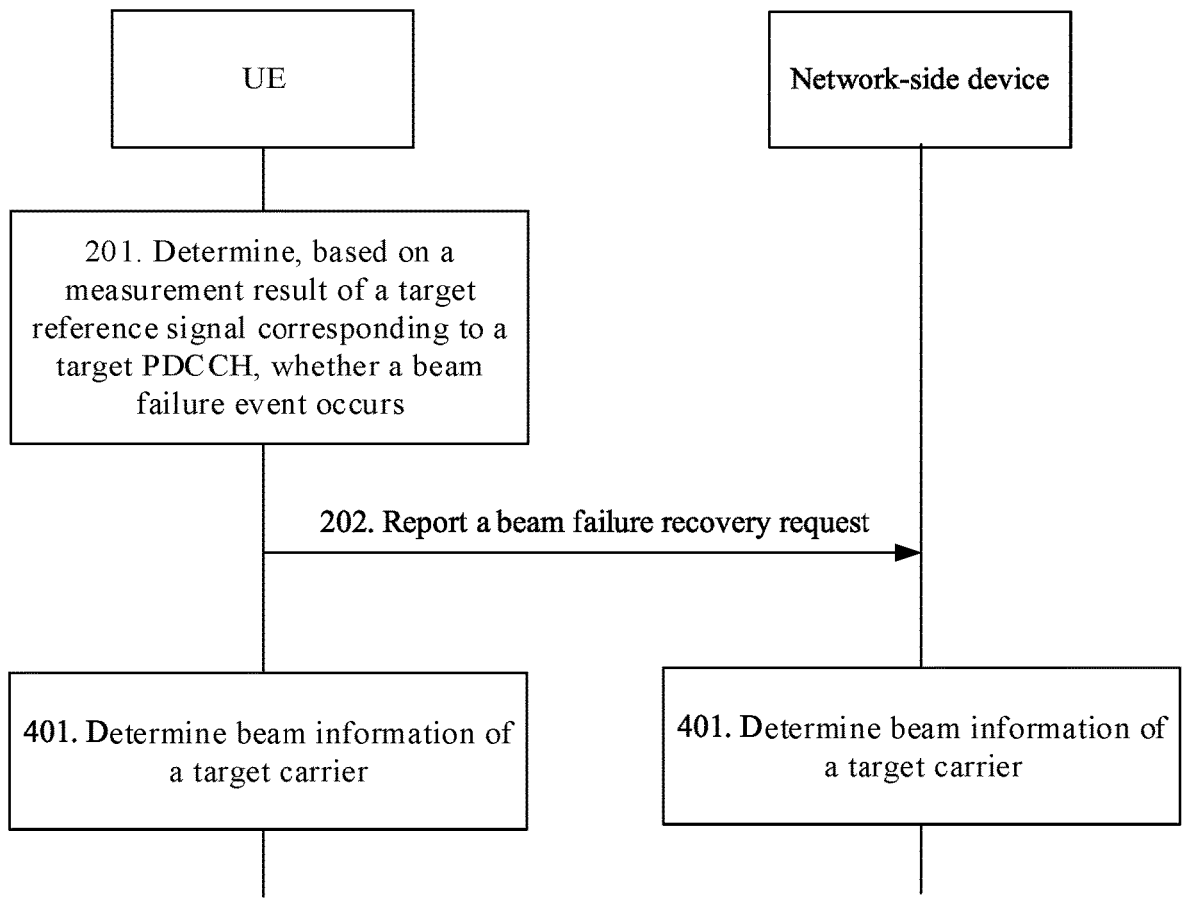
FIG. 5 is a fourth method flowchart of a beam failure recovery method according to an embodiment of this application.

An embodiment of this application provides another beam failure recovery method. With reference to the foregoing content, as shown in FIG. 5, the beam failure recovery method provided in this embodiment of this application may include the following step 401.

Step 401: A beam failure recovery apparatus determines beam information of a target carrier.

The target carrier includes at least one of the following: a CORESET, a channel, and a reference signal.

It should be noted that the CORESET may be any CORESET, or may be a specific CORESET related to a third reference signal resource. Likewise, the channel may be any channel, or may be a specific channel related to a third reference signal resource, and the reference signal may be any reference signal, or may be a specific reference signal related to a third reference signal resource. This is not limited in this embodiment of this application.

It should be noted that the process of reconfiguring the beam information of the target carrier by the beam failure recovery apparatus is performed after UE reports a beam failure recovery request to a network-side device and the network-side device sends a response after receiving the request. For example, step 401 is performed after step 301 and step 302.

For example, the target carrier may be a downlink signal or an uplink signal. When the target carrier is a downlink channel or a downlink reference signal, the beam information of the target carrier may be referred to as TCI state information or QCL information; or when the target carrier is an uplink channel or an uplink reference signal, the beam information of the target carrier may be referred to as spatial relation information.

Further optionally, in this embodiment of this application, step 401 may include the following steps.

Step 401*a*1: The beam failure recovery apparatus determines, based on TCI state information of each third reference signal resource, beam information of a target carrier associated with the third reference signal resource; and/or Step 401*a*2: The beam failure recovery apparatus determines, based on the TCI state information of the third reference signal resource, beam information of a target carrier corresponding to same TRP identification information as the third reference signal resource.

For example, if a first PDCCH is associated with N first CORESETs, the UE may change TCI state information of a first CORESET associated with each of Y third reference signal resources to TCI state information of a third reference signal resource associated with the first CORESET; or if the first PDCCH is associated with one second CORESET, change TCI state information associated with the Y third reference signal resources in the one second CORESET to TCI state information of a third reference signal resource associated with the TCI state information respectively; or in a case that the target carrier includes a CORESET and Y=1, change both TCI state information of a first CORESET associated with the one third reference signal resource and TCI state information of a second CORESET associated with the one third reference signal resource to TCI state information of the one third reference signal resource. It may also be understood that the association is: the third reference signal resource and at least one CORESET correspond to same TRP identification information, or TCI state information of the third reference signal resource and at least one piece of TCI state information of at least one CORESET correspond to same TRP identification information.

Further optionally, in this embodiment of this application, step 401 may include the following step.

Step 401*b*: In a case of Y=1, the beam failure recovery apparatus determines the beam information of the target carrier based on TCI state information of the third reference signal resource, where the target carrier includes channels corresponding to all TRP identification information configured by the network-side device, that is, the network-side device configures all channels on all TRPs in all cells.

Further optionally, in this embodiment of this application, step 401 may include the following step.

Step 401*c*: The beam failure recovery apparatus determines at least one piece of first beam information of the target carrier based on TCI state information of each third reference signal resource.

The at least one piece of first beam information satisfies any one of the following:
the at least one piece of first beam information is associated with the third reference signal resource;
the at least one piece of first beam information is associated with TCI state information of the third reference signal resource;
the at least one piece of first beam information and the third reference signal resource correspond to same TRP identification information; and
the at least one piece of first beam information and TCI state information of the third reference signal resource correspond to same TRP identification information.

For example, in a case that the target carrier includes a channel, the beam failure recovery apparatus may change TCI state information of a channel on a TRP corresponding to each of the Y third reference signal resources to TCI state information of a third reference signal resource corresponding to same TRP identification information as the channel; and/or in a case that the TCI state information of the channel includes Y pieces of TCI state information among a plurality of pieces of TCI state information of a target PDSCH and that the Y pieces of TCI state information of the target PDSCH are in a one-to-one correspondence with same TRP identification information as each of the Y third reference signal resources, the Y pieces of TCI state information of the target PDSCH are changed to TCI state information of a third reference signal resource corresponding to same TRP identification information as the TCI state information.

For example, in a case that Y is equal to 1 and that the TCI state information of the channel includes one piece of TCI state information of the target PDSCH and that the one piece of TCI state information and the TCI state information of the third reference signal resource correspond to same TRP identification information, the one piece of TCI state information is changed to the TCI state information of the one third reference signal resource.

For example, the beam failure recovery apparatus may change a TCI state of a CORESET having a fourth association relationship with a third reference signal resource to a TCI state of the third reference signal resource. In other words, the TCI state of the third reference signal is used to receive the CORESET having the fourth association relationship with the third reference signal. In addition, beam information of other channels (such as a PDSCH, a PUCCH, and a PUSCH) corresponding to same TRP identification information as the third reference signal resource may also be determined based on the TCI state information of the third reference signal resource.

For example, in a case of Y=1 (that is, only one third reference signal is reported), only a TCI state of a CORESET having a sixth association relationship with the one third reference signal resource is changed to a TCI state of the one third reference signal resource. In other words, the TCI state of the one third reference signal resource is used to receive the CORESET having the sixth association relationship with the one third reference signal resource.

For example, in a case of Y=1 (that is, only one third reference signal is reported), TCI states of all CORESETs are changed to a TCI state of the one third reference signal resource. In other words, the TCI state of the one third reference signal is used to receive all the CORESETs.

For example, for a PDSCH scheduled by a network and having a plurality of TCI states, the UE may change each TCI state of the PDSCH to a TCI state of a third reference signal resource having a seventh association relationship with the TCI state. In other words, the TCI state of the third reference signal resource is used to receive the PDSCH having the seventh association relationship with the TCI state. Alternatively, a TCI state of a PDSCH having a seventh association relationship with a third reference signal resource among TCI states of the PDSCH is changed to a TCI state of the third reference signal resource. In other words, the TCI state of the third reference signal resource and a TCI state having no seventh association relationship with the third reference signal resource among the TCI states of the PDSCH are used to receive the PDSCH. It should be noted that the seventh association relationship means that a TCI state of the PDSCH and a third reference signal resource or a TCI state of the third reference signal resource correspond to same TRP identification information.

Further optionally, in this embodiment of this application, in a case that a target PDCCH further includes a second PDCCH, and the target carrier is a third CORESET, step 401 may include the following step.

Step 401c1: The beam failure recovery apparatus determines beam information of the third CORESET based on TCI state information of the third reference signal resource associated with the third CORESET; or Step 401c 2: The beam failure recovery apparatus determines beam information of the third CORESET based on TCI state information of the third reference signal resource corresponding to same TRP identification information as the third CORESET; or Step 401c3: The beam failure recovery apparatus determines beam information of the third CORESET based on TCI state information of a CORESET associated with the first PDCCH.

The third CORESET is a CORESET corresponding to the second PDCCH.

For example, when there is a CORESET corresponding to the second PDCCH (that is, there is a CORESET not having a first association relationship, that is, the foregoing third CORESET), the beam failure recovery apparatus may use a TCI state of a third reference signal resource corresponding to same TRP identification information as the third CORESET to receive the third CORESET. Alternatively, the network-side device may reconfigure the third CORESET to have a first association relationship with other CORESETs, for example, reconfigure the third CORESET as a CORESET associated with the first PDCCH.

For example, in a case that Y is equal to 1 (that is, only one third reference signal is reported) and that the target carrier is the third CORESET, the beam failure recovery apparatus may change TCI state information of the third CORESET to the TCI state information of the one third reference signal resource, or change TCI state information of the third CORESET to the TCI state information of the CORESET associated with the first PDCCH.

It should be noted that the condition that needs to be satisfied by the target carrier may be agreed in a protocol or may be configured by the network-side device. In addition, the condition that needs to be satisfied by the at least one piece of first beam information may be agreed in a protocol or may be configured by the network-side device.

In this way, a beam in which a beam failure event exists is recovered by reconfiguring the TCI state information of the target carrier.

It should be noted that the beam failure recovery method provided in this embodiment of this application may be performed by the beam failure recovery apparatus, or a control module for performing the beam failure recovery method in the beam failure recovery apparatus. For example, the beam failure recovery apparatus in the embodiment corresponding to FIG. 5 may be the UE, or may be the network-side device, that is, the UE and the network-side device may both reconfigure the beam information of the target carrier.

Figure 6:
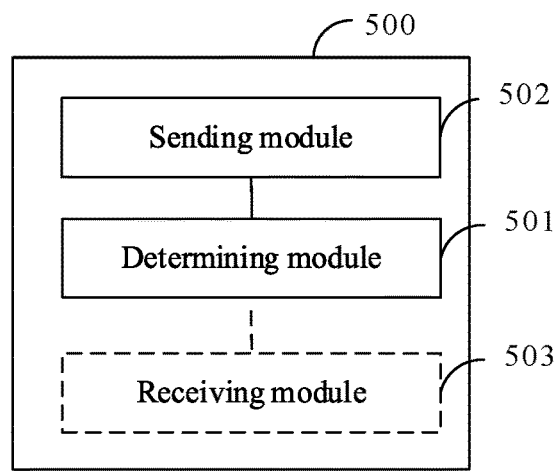
FIG. 6 is a first schematic structural diagram of a beam failure recovery apparatus according to an embodiment of this application.

FIG. 6 is a beam failure recovery apparatus according to an embodiment of this application. As shown in FIG. 6, the apparatus includes a determining module 501 and a sending module 502, where the determining module 501 is configured to determine, based on a measurement result of a target reference signal corresponding to a target physical downlink control channel PDCCH, whether a beam failure event occurs, where the target PDCCH includes at least a first PDCCH repeatedly transmitted for K times, and K≥2; and the sending module 502 is configured to report a beam failure recovery request to a network-side device.

Optionally, the determining module 501 is further configured to determine a reference signal resource set used for measurement, where the reference signal resource set includes a resource of the target reference signal.

Optionally, the reference signal resource set includes a first reference signal resource group corresponding to the first PDCCH.

Optionally, reference signal resources in the first reference signal resource group satisfy at least one of the following:

in a case that the K transmissions of the first PDCCH correspond to K reference signal resources in the first reference signal resource group, and each reference signal resource corresponds to one piece of TCI state information, K pieces of TCI state information corresponding to the K reference signal resources are in a one-to-one correspondence with and the same as K pieces of TCI state information in the K transmissions;

in a case that the K transmissions of the first PDCCH correspond to one reference signal resource in the first reference signal resource group, and the one reference signal resource corresponds to K pieces of TCI state information, the K pieces of TCI state information corresponding to the one reference signal resource are in a one-to-one correspondence with and the same as K pieces of TCI state information in the K transmissions; and if the K transmissions of the first PDCCH correspond to at least one reference signal resource in the first reference signal resource group, and each of the at least one reference signal resource corresponds to at least one piece of TCI state information, all TCI state information corresponding to the at least one reference signal resource is in a one-to-one correspondence with and the same as K pieces of TCI state information in the K transmissions.

Optionally, in a case that the first PDCCH is associated with N first CORESETs and that each first CORESET has one piece of TCI state information, the K pieces of TCI state information in the K transmissions include TCI state information of each first CORESET;

in a case that the first PDCCH is associated with one first CORESET and that the one first CORESET has a plurality of pieces of TCI state information, the K pieces of TCI state information in the K transmissions include each piece of TCI state information of the one first CORESET; or in a case that the first PDCCH is associated with N first CORESETs and that at least one of the N first CORESETs has a plurality of pieces of TCI state information, the K pieces of TCI state information in the K transmissions include each piece of TCI state information of each first CORESET, where N is an integer greater than 1.

Optionally, the apparatus further includes a receiving module 503, where the receiving module 503 is configured to receive indication information from the network-side device; and the determining module is specifically configured to determine, based on the indication information received by the receiving module, the reference signal resource set used for measurement.

Optionally, reference signal resources in the first reference signal resource group are source RS resources indicated by TCI state information used in each of the K transmissions of the first PDCCH.

Optionally, in a case that the first PDCCH is associated with N first CORESETs and that each first CORESET has one piece of TCI state information, the source RS resources include a part or all of source RS resources indicated by TCI state information of each first CORESET;

in a case that the first PDCCH is associated with one first CORESET and that the one first CORESET has a plurality of pieces of TCI state information, the source RS resources include a part or all of source RS resources indicated by each piece of TCI state information of the one first CORESET; or in a case that the first PDCCH is associated with N first CORESETs and that at least one of the N first CORESETs has a plurality of pieces of TCI state information, the source RS resources include a part or all of source RS resources indicated by each piece of TCI state information of each first CORESET.

Optionally, the one first CORESET satisfies at least one of the following:

configuration information of the one first CORESET does not include TRP identification information, configuration information of the one first CORESET corresponds to one piece of TRP identification information, at least one piece of TCI state information of the one first CORESET corresponds to same TRP identification information, and at least one piece of TCI state information of the one first CORESET corresponds to different TRP identification information; and in a case that the first PDCCH is associated with the N first CORESETs and that each first CORESET has one piece of TCI state information or that a part or all of the N first CORESETs have a plurality of pieces of TCI state information, the N first CORESETs satisfy at least one of the following:

at least one of the N first CORESETs corresponds to different TRP identification information, at least one of the N first CORESETs corresponds to same TRP identification information, at least one piece of TCI state information corresponding to at least one first CORESET corresponds to same TRP identification information, and at least one piece of TCI state information corresponding to at least one first CORESET corresponds to different TRP identification information.

Optionally, the part of source RS resources include source RS resources indicated by TCI state information satisfying a predetermined condition, where the predetermined condition includes at least one of the following:

TCI state information indicating mutually different source reference signals,

TCI state information corresponding to a predetermined TCI state identifier,

TCI state information corresponding to different TRP identification information, TCI state information whose measurement performance satisfies a predetermined performance condition, TCI state information of a first CORESET corresponding to different TRP identification information, among the N first CORESETs, TCI state information of a first CORESET corresponding to a low CORESET ID, among the N first CORESETs, TCI state information of a recently measured first CORESET among the N first CORESETs, and TCI state information of a first CORESET whose measurement performance satisfies a predetermined performance condition, among the N first CORESETs.

Optionally, the determining module 501 is further configured to determine a measurement result of the first reference signal resource group.

Optionally, the measurement result of the first reference signal resource group includes at least one of the following:

a measurement result of each reference signal resource in the first reference signal resource group;

a joint measurement result obtained by combining measurement results of all of at least one first reference signal resource;

a measurement result of each of at least one second reference signal resource; and a joint measurement result obtained by combining measurement results of all of at least one second reference signal resource.

The at least one first reference signal resource is at least one reference signal resource in the first reference signal resource group; and the at least one second reference signal resource is at least one reference signal resource in the first reference signal resource group, and each second reference signal resource corresponds to one or more pieces of TCI state information.

Optionally, in a case that one second reference signal resource corresponds to a plurality of pieces of TCI state information, a measurement result of the one second reference signal resource includes at least one of the following:

a measurement result when the one second reference signal resource uses each of M pieces of first TCI state information; and a joint measurement result obtained by combining measurement results when the one second reference signal resource uses all of M pieces of first TCI state information, where the M pieces of first TCI state information are at least one piece of TCI state information among the plurality of pieces of TCI state information corresponding to the one second reference signal resource.

Optionally, the M pieces of first TCI state information are TCI state information satisfying a first condition, where the first condition includes all TCI state information corresponding to the one second reference signal resource, or TCI state information corresponding to same TRP identification information, among the plurality of pieces of TCI state information corresponding to the one second reference signal resource.

Optionally, the first reference signal resource is a reference signal resource satisfying a second condition, where the second condition includes all reference signal resources in the first reference signal resource group, or reference signal resources corresponding to same TRP identification information, in the first reference signal resource group.

Optionally, the determining module 501 is further configured to: in a case that the measurement result of the first reference signal resource group satisfies a first preset condition, determine that the beam failure event occurs.

Optionally, the target PDCCH further includes a second PDCCH, and the second PDCCH is not repeatedly transmitted.

Optionally, the target PDCCH further includes a second PDCCH, and the second PDCCH is not repeatedly transmitted; and the determining module 501 is further configured to: in a case that both the measurement result of the first reference signal resource group and a measurement result of a target reference signal resource corresponding to the second PDCCH satisfy a second preset condition, determine that the beam failure event occurs.

Optionally, the beam failure recovery request includes information of Y third reference signal resources, where the third reference signal resource is used for beam failure recovery; and the Y third reference signal resources are candidate beam reference signal resources satisfying a third condition, in X groups of candidate beam reference signal resources; and each group of candidate beam reference signal resources includes at least one candidate beam reference signal resource, and Y is a positive integer.

Optionally, the X groups of candidate beam reference signal resources satisfy at least one of the following:
- a first resource condition, a second resource condition, and a third resource condition, where
- the first resource condition includes either of the following: the candidate beam reference signal resource in each group of candidate beam reference signal resources does not correspond to TRP identification information, and the candidate beam reference signal resource in each group of candidate beam reference signal resources corresponds to same TRP identification information;
- the second resource condition includes at least one of the following conditions in a case that the first PDCCH is associated with N first control resource sets CORESETs:
- the candidate beam reference signal resource in each group of candidate beam reference signal resources does not correspond to TRP identification information; the candidate beam reference signal resource in each group of candidate beam reference signal resources corresponds to same TRP identification information; the candidate beam reference signal resource in each group of candidate beam reference signal resources is associated with at least one of the N first CORESETs; the candidate beam reference signal resource in each group of candidate beam reference signal resources and at least one of the N first CORESETs correspond to same TRP identification information; the candidate beam reference signal resource in each group of candidate beam reference signal resources is associated with at least one piece of TCI state information of at least one of the N first CORESETs; and the candidate beam reference signal resource in each group of candidate beam reference signal resources and at least one piece of TCI state information of at least one of the N first CORESETs correspond to same TRP identification information; and
- the third resource condition includes at least one of the following conditions in a case that the first PDCCH is associated with one second CORESET: each group of candidate beam reference signal resources is associated with at least one piece of TCI state information of the one second CORESET; and each group of candidate beam reference signal resources and at least one piece of TCI state information of the one second CORESET correspond to same TRP identification information.

Optionally, the Y third reference signal resources are:
all or part of candidate beam reference signal resources satisfying a fourth condition, in each of at least one group of candidate beam reference signal resources in the X groups of candidate beam reference signal resources; or
all or part of candidate beam reference signal resources satisfying a fifth condition, in the X groups of candidate beam reference signal resources, where Y≤X.

Optionally, the Y third reference signal resources satisfy at least one of the following:
- a fourth resource condition, a fifth resource condition, and a sixth resource condition, where
- the fourth resource condition includes: each third reference signal resource corresponds to one piece of TRP identification information;
- the fifth resource condition includes at least one of the following conditions in the case that the first PDCCH is associated with the N first CORESETs: each third reference signal resource does not correspond to TRP identification information; each third reference signal resource corresponds to same TRP identification information; each third reference signal resource corresponds to at least one of the N first CORESETs; each third reference signal resource and at least one of the N first CORESETs correspond to same TRP identification information; each third reference signal resource corresponds to at least one piece of TCI state information of at least one of the N first CORESETs; and each third reference signal resource and at least one piece of TCI state information of at least one of the N first CORESETs correspond to same TRP identification information; and
- the sixth resource condition includes at least one of the following conditions in the case that the first PDCCH is associated with the one second CORESET: each third reference signal resource corresponds to at least one piece of TCI state information of the one second CORESET; and each third reference signal resource and at least one piece of TCI state information of the one second CORESET correspond to same TRP identification information.

Optionally, the information of the third reference signal resource includes: a candidate beam reference signal resource corresponding to same TRP identification information as a third CORESET, in the X groups of candidate beam reference signal resources; or a candidate beam reference signal resource associated with a third CORESET, in the X groups of candidate beam reference signal resources, where the target PDCCH further includes a second PDCCH, the second PDCCH is not repeatedly transmitted, and the third CORESET is a CORESET corresponding to the second PDCCH.

Optionally, the sending module 502 is specifically configured to report the beam failure recovery request to the network-side device by using a target uplink resource, where the target uplink resource includes a PRACH resource, a resource carrying a MAC CE, or a PUCCH resource.

Optionally, in a case of Y≥1, the target uplink resource includes all or part of PRACH resources corresponding to each of the Y third reference signal resources; or
in a case of Y=1, the target uplink resource includes one PRACH resource corresponding to the one third reference signal resource.

Optionally, the determining module 501 is further configured to: in a case that the target uplink resource includes a PRACH resource, determine TRP identification information corresponding to the PRACH resource.

Optionally, the determining module 501 is specifically configured to determine, according to a predetermined rule, the TRP identification information corresponding to the PRACH resource, where the first predetermined rule includes any one of the following:
the third reference signal resource and the PRACH resource corresponding to the third reference signal resource correspond to same TRP identification information;
the PRACH resource may correspond to preset TRP identification information;
the PRACH resource may correspond to any TRP identification information; and
the PRACH resource may correspond to all TRP identification information.

Optionally, in a case that the target uplink resource includes a resource carrying a MAC CE or a PUCCH resource, the target uplink resource carries at least one of the following information:
the information of the Y third reference signal resources;
identification information of a TRP on which the beam failure event occurs; and
TRP identification information corresponding to the Y third reference signal resources.

Optionally, the sending module 502 is further configured to: in a case that the target uplink resource includes a resource carrying a MAC CE, if no uplink grant is available, send a scheduling request to a target TRP, where the scheduling request is used to request an available uplink grant.

Optionally, the target TRP is all or part of TRPs corresponding to the Y third reference signal resources, or all TRPs or any TRP configured by the network-side device for the UE.

Optionally, the receiving module 503 is further configured to receive a beam failure recovery response from the network-side device by using H fourth CORESETs, where H is a positive integer.

Optionally, the H fourth CORESETs satisfy at least one of the following:
each of the H fourth CORESETs is in a one-to-one correspondence with and associated with each of the X groups of candidate beam reference signal resources;
TRP identification information corresponding to each of the H fourth CORESETs is in a one-to-one correspondence with and the same as TRP identification information corresponding to each of the X groups of candidate beam reference signal resources;
each of at least one of the H fourth CORESETs is in a one-to-one correspondence with and quasi-co-located QCLed with each of the Y third reference signal resources;
each of at least one of the H fourth CORESETs is in a one-to-one correspondence with and associated with each of the Y third reference signal resources; and
TRP identification information corresponding to each of at least one of the H fourth CORESETs is in a one-to-one correspondence with and the same as TRP identification information corresponding to each of the Y third reference signal resources.

Optionally, in a case that H is equal to 1, the receiving module is specifically configured to monitor the CORESET based on QCL information of the fourth CORESET;
the one fourth CORESET satisfies at least one of the following:
the one fourth CORESET is associated with one of the X groups of candidate beam reference signal resources;
the one fourth CORESET and one of the X groups of candidate beam reference signal resources correspond to same TRP identification information;
the one fourth CORESET is quasi-co-located QCLed with one of the Y third reference signal resources;
the one fourth CORESET is associated with one of the Y third reference signal resources; and
the one fourth CORESET and one of the Y third reference signal resources correspond to same TRP identification information; and
the one third reference signal resource is a third reference signal resource in one group of candidate beam reference signal resources associated with the one fourth CORESET, a third reference signal resource in one group of candidate beam reference signal resources corresponding to same TRP identification information as the one fourth CORESET, or any one of the Y third reference signal resources.

Optionally, the receiving module 503 is further configured to: monitor the fourth CORESET based on TCI state information of a target third reference signal resource, where the target third reference signal resource is at least one of the Y third reference signal resources.

Optionally, the target third reference signal resource satisfies at least one of the following:
all or part of the Y third reference signal resources;
a reference signal resource with best signal quality among the Y third reference signal resources;
a third reference signal resource corresponding to a candidate beam reference signal resource group having a preset group identifier, among the Y third reference signal resources; and
a third reference signal resource corresponding to a preset resource index, among the Y third reference signal resources.

Optionally, the determining module 501 is further configured to determine beam information of a target carrier, where
the target carrier includes at least one of the following: a control resource set CORESET, a channel, and a reference signal.

Optionally, the determining module 501 is specifically configured to: determine, based on TCI state information of each third reference signal resource, beam information of a target carrier associated with the third reference signal resource; and determine, based on the TCI state information of the third reference signal resource, beam information of a target carrier corresponding to same TRP identification information as the third reference signal resource.

Optionally, the determining module 501 is specifically configured to: in a case of Y=1, determine the beam information of the target carrier based on TCI state information of the third reference signal resource, where the target carrier includes a carrier corresponding to all TRP identification information configured by the network-side device.

Optionally, the determining module 501 is specifically configured to determine at least one piece of first beam information of the target carrier based on TCI state information of each third reference signal resource, where
the at least one piece of first beam information satisfies any one of the following:
the at least one piece of first beam information is associated with the third reference signal resource;
the at least one piece of first beam information is associated with TCI state information of the third reference signal resource;

the at least one piece of first beam information and the third reference signal resource correspond to same TRP identification information; and the at least one piece of first beam information and TCI state information of the third reference signal resource correspond to same TRP identification information.

Optionally, the target PDCCH further includes a second PDCCH, and the second PDCCH is not repeatedly transmitted; the target carrier is a third CORESET, and the third CORESET is a CORESET corresponding to the second PDCCH; and the determining module 501 is specifically configured to: determine beam information of the third CORESET based on TCI state information of a third reference signal resource associated with the third CORESET; or determine beam information of the third CORESET based on TCI state information of a third reference signal resource corresponding to same TRP identification information as the third CORESET; or determine beam information of the third CORESET based on TCI state information of a CORESET associated with the first PDCCH.

The beam failure recovery apparatus provided in this embodiment of this application determines, based on the measurement result of the target reference signal corresponding to the target PDCCH, whether the beam failure event occurs, where the target PDCCH includes at least the first PDCCH repeatedly transmitted for the K times, and K≥2; and reports the beam failure recovery request to the network-side device. In this way, beam failure recovery can be implemented in a scenario supporting repeated transmission of the PDCCH.

Figure 7:
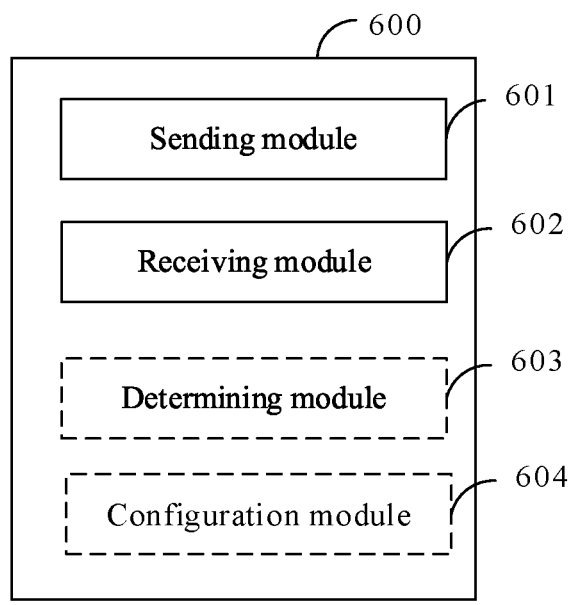
FIG. 7 is a second schematic structural diagram of a beam failure recovery apparatus according to an embodiment of this application.

FIG. 7 is a beam failure recovery apparatus provided in an embodiment of this application. As shown in FIG. 7, the apparatus includes a sending module 601 and a receiving module 602, where the sending module 601 is configured to send indication information to UE, where the indication information indicates a reference signal resource set used for measurement, the reference signal resource set includes a resource of a target reference signal corresponding to a target PDCCH, the target reference signal is used for beam failure detection, the target PDCCH includes at least a first PDCCH repeatedly transmitted for K times, and K≥2; and the receiving module 602 is configured to receive a beam failure recovery request from the UE.

Optionally, the sending module 601 is specifically configured to send the indication information to the UE according to a second predetermined rule.

Optionally, the reference signal resource set includes a first reference signal resource group corresponding to the first PDCCH.

Optionally, the second predetermined rule includes:
reference signal resources in the first reference signal resource group satisfy at least one of the following:
in a case that the K transmissions of the first PDCCH correspond to K reference signal resources in the first reference signal resource group, and each reference signal resource corresponds to one piece of TCI state information, K pieces of TCI state information corresponding to the K reference signal resources are in a one-to-one correspondence with and the same as K pieces of TCI state information in the K transmissions;
in a case that the K transmissions of the first PDCCH correspond to one reference signal resource in the first reference signal resource group, and the one reference signal resource corresponds to K pieces of TCI state information, the K pieces of TCI state information corresponding to the one reference signal resource are in a one-to-one correspondence with and the same as K pieces of TCI state information in the K transmissions; and in a case that the K transmissions of the first PDCCH correspond to at least one reference signal resource in the first reference signal resource group, and each of the at least one reference signal resource corresponds to at least one piece of TCI state information, all TCI state information corresponding to the at least one reference signal resource is in a one-to-one correspondence with and the same as K pieces of TCI state information in the K transmissions.

Optionally, the second predetermined rule includes at least one of the following:
in a case that the first PDCCH is associated with N first CORESETs and that each first CORESET has one piece of TCI state information, the K pieces of TCI state information in the K transmissions include TCI state information of each first CORESET;
in a case that the first PDCCH is associated with one first CORESET and that the one first CORESET has a plurality of pieces of TCI state information, the K pieces of TCI state information in the K transmissions include each piece of TCI state information of the one first CORESET; or
in a case that the first PDCCH is associated with N first CORESETs and that at least one of the N first CORESETs has a plurality of pieces of TCI state information, the K pieces of TCI state information in the K transmissions include each piece of TCI state information of each first CORESET, where
N is an integer greater than 1.

Optionally, reference signal resources in the first reference signal resource group are source RS resources indicated by TCI state information used in each of the K transmissions of the first PDCCH.

Optionally, the second predetermined rule includes at least one of the following:
in a case that the first PDCCH is associated with N first CORESETs and that each first CORESET has one piece of TCI state information, the source RS resources include a part or all of source RS resources indicated by TCI state information of each first CORESET;
in a case that the first PDCCH is associated with one first CORESET and that the one first CORESET has a plurality of pieces of TCI state information, the source RS resources include a part or all of source RS resources indicated by each piece of TCI state information of the one first CORESET; or
in a case that the first PDCCH is associated with N first CORESETs and that at least one of the N first CORESETs has a plurality of pieces of TCI state information, the source RS resources include a part or all of source RS resources indicated by each piece of TCI state information of each first CORESET.

Optionally, the second predetermined rule further includes:
the one first CORESET satisfies at least one of the following:
configuration information of the one first CORESET does not include TRP identification information,
configuration information of the one first CORESET corresponds to one piece of TRP identification information,
at least one piece of TCI state information of the one first CORESET corresponds to same TRP identification information, and at least one piece of TCI state information of the one first CORESET corresponds to different TRP identification information; and in a case that the first PDCCH is associated with the N first CORESETs and that each first CORESET has one piece of TCI state information or that at least one of the N first CORESETs has a plurality of pieces of TCI state information, the N first CORESETs satisfy at least one of the following:

at least one of the N first CORESETs corresponds to different TRP identification information, at least one of the N first CORESETs corresponds to same TRP identification information, at least one piece of TCI state information corresponding to at least one first CORESET corresponds to same TRP identification information, and at least one piece of TCI state information corresponding to at least one first CORESET corresponds to different TRP identification information.

Optionally, the part of source RS resources include source RS resources indicated by TCI state information satisfying a predetermined condition, where the predetermined condition includes at least one of the following:

TCI state information indicating mutually different source reference signals,

TCI state information corresponding to a predetermined TCI state identifier,

TCI state information corresponding to different TRP identification information, TCI state information whose measurement performance satisfies a predetermined performance condition, TCI state information of a first CORESET corresponding to different TRP identification information, among the N first CORESETs, TCI state information of a first CORESET corresponding to a low CORESET ID, among the N first CORESETs, TCI state information of a recently measured first CORESET among the N first CORESETs, and TCI state information of a first CORESET whose measurement performance satisfies a predetermined performance condition, among the N first CORESETs.

Optionally, the beam failure recovery request includes information of Y third reference signal resources, where the third reference signal resource is used for beam failure recovery; and the Y third reference signal resources are candidate beam reference signal resources satisfying a third condition, in X groups of candidate beam reference signal resources; and each group of candidate beam reference signal resources includes at least one candidate beam reference signal resource, and Y is a positive integer.

Optionally, the X groups of candidate beam reference signal resources satisfy at least one of the following:

a first resource condition, a second resource condition, and a third resource condition, where the first resource condition includes either of the following: the candidate beam reference signal resource in each group of candidate beam reference signal resources does not correspond to TRP identification information, and the candidate beam reference signal resource in each group of candidate beam reference signal resources corresponds to same TRP identification information;

the second resource condition includes at least one of the following conditions in a case that the first PDCCH is associated with N first control resource sets CORESETs:

the candidate beam reference signal resource in each group of candidate beam reference signal resources does not correspond to TRP identification information; the candidate beam reference signal resource in each group of candidate beam reference signal resources corresponds to same TRP identification information; the candidate beam reference signal resource in each group of candidate beam reference signal resources is associated with at least one of the N first CORESETs; the candidate beam reference signal resource in each group of candidate beam reference signal resources and at least one of the N first CORESETs correspond to same TRP identification information; the candidate beam reference signal resource in each group of candidate beam reference signal resources is associated with at least one piece of TCI state information of at least one of the N first CORESETs; and the candidate beam reference signal resource in each group of candidate beam reference signal resources and at least one piece of TCI state information of at least one of the N first CORESETs correspond to same TRP identification information; and the third resource condition includes at least one of the following conditions in a case that the first PDCCH is associated with one second CORESET: each group of candidate beam reference signal resources is associated with at least one piece of TCI state information of the one second CORESET; and each group of candidate beam reference signal resources and at least one piece of TCI state information of the one second CORESET correspond to same TRP identification information.

Optionally, the Y third reference signal resources are:

all or part of candidate beam reference signal resources satisfying a fourth condition, in each of at least one group of candidate beam reference signal resources in the X groups of candidate beam reference signal resources; or all or part of candidate beam reference signal resources satisfying a fifth condition, in the X groups of candidate beam reference signal resources, where

Y≤X.

Optionally, the Y third reference signal resources satisfy at least one of the following:

a fourth resource condition, a fifth resource condition, and a sixth resource condition, where the fourth resource condition includes: each third reference signal resource corresponds to one piece of TRP identification information;

the fifth resource condition includes at least one of the following conditions in the case that the first PDCCH is associated with the N first control resource sets CORESETs: each third reference signal resource does not correspond to TRP identification information; each third reference signal resource corresponds to same TRP identification information; each third reference signal resource corresponds to at least one of the N first CORESETs; each third reference signal resource and at least one of the N first CORESETs correspond to same TRP identification information; each third reference signal resource corresponds to at least one piece of TCI state information of at least one of the N first CORESETs; and each third reference signal resource and at least one piece of TCI state information of at least one of the N first CORESETs correspond to same TRP identification information; and the sixth resource condition includes at least one of the following conditions in the case that the first PDCCH is associated with the one second CORESET: each third reference signal resource corresponds to at least one piece of TCI state information of the one second CORESET; and each third reference signal resource and at least one piece of TCI state information of the one second CORESET correspond to same TRP identification information.

Optionally, the information of the third reference signal resource includes: a candidate beam reference signal resource corresponding to same TRP identification information as a third CORESET, in the X groups of candidate beam reference signal resources; or a candidate beam reference signal resource associated with a third CORESET, in the X groups of candidate beam reference signal resources, where the target PDCCH further includes a second PDCCH, the second PDCCH is not repeatedly transmitted, and the third CORESET is a CORESET corresponding to the second PDCCH.

Optionally, the receiving module 602 is specifically configured to receive the beam failure recovery request from the UE by using a target uplink resource, where the target uplink resource includes a PRACH resource, a resource carrying a MAC CE, or a PUCCH resource.

Optionally, in a case of Y≥1, the target uplink resource includes all or part of PRACH resources corresponding to each of the Y third reference signal resources; or in a case of Y=1, the target uplink resource includes one PRACH resource corresponding to the one third reference signal resource.

Optionally, as shown in FIG. 7, the apparatus further includes a determining module 603, where the determining module 603 is configured to: in a case that the target uplink resource includes a PRACH resource, determine TRP identification information corresponding to the PRACH resource.

Optionally, the determining module 603 is specifically configured to determine, according to a first predetermined rule, the TRP identification information corresponding to the PRACH resource, where the first predetermined rule includes any one of the following:
the third reference signal resource and the PRACH resource corresponding to the third reference signal resource correspond to same TRP identification information;
the PRACH resource may correspond to preset TRP identification information;
the PRACH resource may correspond to any TRP identification information; and
the PRACH resource may correspond to all TRP identification information.

Optionally, in a case that the target uplink resource includes a resource carrying a MAC CE or a PUCCH resource, the target uplink resource carries at least one of the following information:
the information of the Y third reference signal resources;
identification information of a TRP on which the beam failure event occurs; and TRP identification information corresponding to the Y third reference signal resources.

Optionally, the sending module 601 is further configured to send a beam failure recovery response to the UE by using H fourth CORESETs, where H is a positive integer.

Optionally, as shown in FIG. 7, the apparatus further includes a configuration module 604, where the configuration module 604 is configured to configure at least one fourth CORESET for the UE, where the fourth CORESET is used to carry the beam failure recovery response, and the at least one fourth CORESET includes the H fourth CORESETs.

Optionally, the configuration module 604 is further configured to configure a rule for determining the H fourth CORESETs for the UE.

Optionally, the determining rule is used to indicate that the H fourth CORESETs need to satisfy at least one of the following:
each of the H fourth CORESETs is in a one-to-one correspondence with and associated with each of the X groups of candidate beam reference signal resources;
TRP identification information corresponding to each of the H fourth CORESETs is in a one-to-one correspondence with and the same as TRP identification information corresponding to each of the X groups of candidate beam reference signal resources;
each of at least one of the H fourth CORESETs is in a one-to-one correspondence with and quasi-co-located QCLed with each of the Y third reference signal resources;
each of at least one of the H fourth CORESETs is in a one-to-one correspondence with and associated with each of the Y third reference signal resources; and
TRP identification information corresponding to each of at least one of the H fourth CORESETs is in a one-to-one correspondence with and the same as TRP identification information corresponding to each of the Y third reference signal resources.

Optionally, in a case that H is equal to 1, the determining rule is used to indicate that the one fourth CORESET satisfies at least one of the following:
the one fourth CORESET is associated with one of the X groups of candidate beam reference signal resources;
the one fourth CORESET and one of the X groups of candidate beam reference signal resources correspond to same TRP identification information;
the one fourth CORESET is quasi-co-located QCLed with one of the Y third reference signal resources;
the one fourth CORESET is associated with one of the Y third reference signal resources; and
the one fourth CORESET and one of the Y third reference signal resources correspond to same TRP identification information; and
the one third reference signal resource is a third reference signal resource in one group of candidate beam reference signal resources associated with the one fourth CORESET, a third reference signal resource in one group of candidate beam reference signal resources corresponding to same TRP identification information as the one fourth CORESET, or any one of the Y third reference signal resources.

Optionally, the determining rule is used to instruct the UE to monitor the fourth CORESET based on TCI state information of a target third reference signal resource; and the determining rule is further used to indicate that the target third reference signal resource needs to satisfy at least one of the following:
all or part of the Y third reference signal resources;
a reference signal resource with best signal quality among the Y third reference signal resources;

a third reference signal resource corresponding to a candidate beam reference signal resource group having a preset group identifier, among the Y third reference signal resources; and a third reference signal resource corresponding to a preset resource index, among the Y third reference signal resources.

Optionally, before the receiving a beam failure recovery request from the UE, the configuration module 604 is further configured to:

configure at least one group of candidate beam reference signal resources for the UE, where each group of candidate beam reference signal resources includes at least one candidate beam reference signal resource, and the at least one group of candidate beam reference signal resources includes the X groups of candidate beam reference signal resources.

Optionally, the determining module 603 is further configured to determine beam information of a target carrier, where the target carrier includes at least one of the following: a control resource set CORESET, a channel, and a reference signal.

Optionally, the determining module 603 is specifically configured to: determine, based on TCI state information of each third reference signal resource, beam information of a target carrier associated with the third reference signal resource; and determine, based on the TCI state information of the third reference signal resource, beam information of a target carrier corresponding to same TRP identification information as the third reference signal resource.

Optionally, the determining module 603 is specifically configured to: in a case of Y=1, determine the beam information of the target carrier based on TCI state information of the third reference signal resource, where the target carrier includes a carrier corresponding to all TRP identification information configured by a network-side device.

Optionally, the determining module 603 is specifically configured to determine at least one piece of first beam information of the target carrier based on TCI state information of each third reference signal resource, where the at least one piece of first beam information satisfies any one of the following:

the at least one piece of first beam information is associated with the third reference signal resource;

the at least one piece of first beam information is associated with TCI state information of the third reference signal resource;

the at least one piece of first beam information and the third reference signal resource correspond to same TRP identification information; and the at least one piece of first beam information and TCI state information of the third reference signal resource correspond to same TRP identification information.

Optionally, the target PDCCH further includes a second PDCCH, and the second PDCCH is not repeatedly transmitted; the target carrier is a third CORESET, and the third CORESET is a CORESET corresponding to the second PDCCH; and the determining module 603 is specifically configured to: determine beam information of the third CORESET based on TCI state information of a third reference signal resource associated with the third CORESET; or determine beam information of the third CORESET based on TCI state information of a third reference signal resource corresponding to same TRP identification information as the third CORESET; or determine beam information of the third CORESET based on TCI state information of a CORESET associated with the first PDCCH.

The beam failure recovery apparatus provided in this embodiment of this application sends the indication information to the UE, to indicate the reference signal resource set used for measurement to the UE, where the reference signal resource set includes the resource of the target reference signal used for beam failure detection, the target PDCCH includes at least the first PDCCH repeatedly transmitted for the K times, and K≥2; and receives the beam failure recovery request from the UE. In this way, beam failure recovery can be implemented in a scenario supporting repeated transmission of the PDCCH.

The beam failure recovery apparatus in this embodiment of this application may be an apparatus, or may be a component, an integrated circuit, or a chip in a terminal. The apparatus may be a mobile terminal, or may be a non-mobile terminal. For example, the mobile terminal may include but is not limited to the foregoing illustrated type of the terminal 11. The non-mobile terminal may be a server, a network attached storage (NAS), a personal computer (PC), a television (TV), a teller machine, a self-service machine, or the like. This is not specifically limited in this embodiment of this application.

The beam failure recovery apparatus in this embodiment of this application may be an apparatus having an operating system. The operating system may be an Android operating system, an iOS operating system, or other possible operating systems, and is not specifically limited in this embodiment of this application.

The beam failure recovery apparatus provided in this embodiment of this application can implement each process of the foregoing method embodiment, with the same technical effect achieved. To avoid repetition, details are not described herein again.

Figure 8:
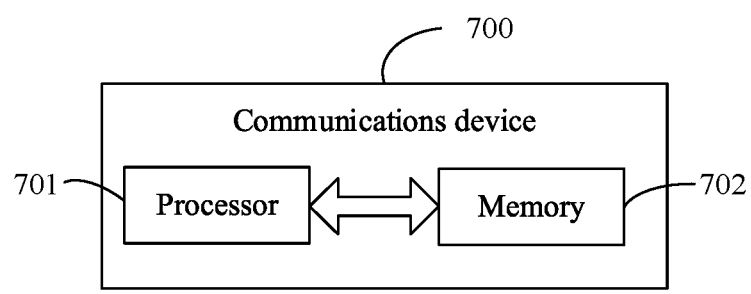
FIG. 8 is a schematic structural diagram of a communications device according to an embodiment of this application.

Optionally, as shown in FIG. 8, an embodiment of this application further provides a communications device 700, including a processor 701, a memory 702, and a program or instructions stored in the memory 702 and capable of running on the processor 701. For example, when the communications device 700 is a terminal, and the program or instructions are executed by the processor 701, each process of the foregoing beam failure recovery method embodiment is implemented, with the same technical effect achieved. When the communications device 700 is a network-side device, and the program or instructions are executed by the processor 701, each process of the foregoing beam failure recovery method embodiment is implemented, with the same technical effect achieved. To avoid repetition, details are not described herein again.

Figure 9:
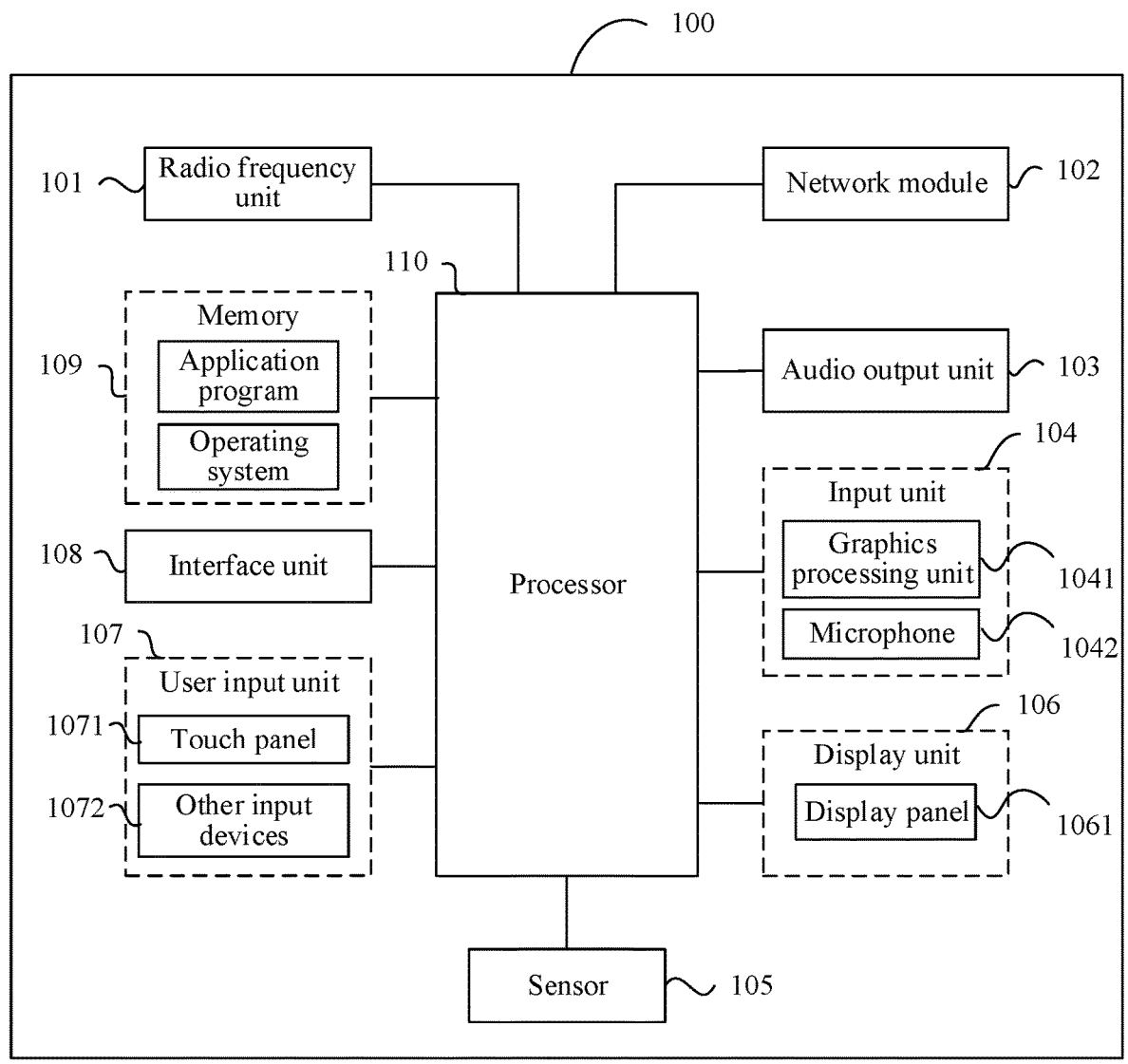
FIG. 9 is a schematic structural diagram of a terminal according to an embodiment of this application.

FIG. 9 is a schematic diagram of a hardware structure of a terminal for implementing an embodiment of this application.

The terminal 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the terminal 100 may further include a power supply (for example, a battery) supplying power to all components. Optionally, the power supply may be logically connected to the processor 110 through a power management system. In this way, functions such as charge management, discharge management, and power consumption management are implemented by using the power management system. The terminal structure shown in FIG. 9 does not constitute a limitation on the terminal. The terminal may include more or fewer components than those shown in the figure, or some components are combined, or component arrangements are different. Details are not described herein again.

It should be understood that, in this embodiment of this application, the input unit 104 may include a graphics processing unit (GPU) 1041 and a microphone 1042. The graphics processing unit 1041 processes image data of a still picture or video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function key (such as a volume control key or a switch key), a trackball, a mouse, and a joystick. Details are not described herein again. In this embodiment of this application, after receiving downlink data from a network-side device, the radio frequency unit 101 sends the downlink data to the processor 110 for processing, and in addition, sends uplink data to the network-side device. Generally, the radio frequency unit 101 includes but is not limited to an antenna, at least one amplifier, a transceiver, a coupler, a low noise amplifier, a duplexer, and the like. The memory 109 may be configured to store software programs or instructions and various data. The memory 109 may primarily include a program or instruction storage area and a data storage area. The program or instruction storage area may store an operating system, an application program or instructions (such as an audio play function and an image play function) required by at least one function, and the like. In addition, the memory 109 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device. The processor 110 may include one or more processing units. Optionally, the processor 110 may integrate an application processor and a modem processor. The application processor mainly processes the operating system, a user interface, an application program, an instruction, or the like. The modem processor mainly processes wireless communication. For example, the modem processor is a baseband processor. It may be understood that the modem processor may alternatively be not integrated in the processor 110.

The processor 110 is configured to determine, based on a measurement result of a target reference signal corresponding to a target physical downlink control channel PDCCH, whether a beam failure event occurs, where the target PDCCH includes at least a first PDCCH repeatedly transmitted for K times, and K≥2; and the radio frequency unit 101 is configured to report a beam failure recovery request to a network-side device.

The terminal provided in this embodiment of this application determines, based on the measurement result of the target reference signal corresponding to the target PDCCH, whether the beam failure event occurs, where the target PDCCH includes at least the first PDCCH repeatedly transmitted for the K times, and K≥2; and reports the beam failure recovery request to the network-side device. In this way, beam failure recovery can be implemented in a scenario supporting repeated transmission of the PDCCH.

Figure 10:
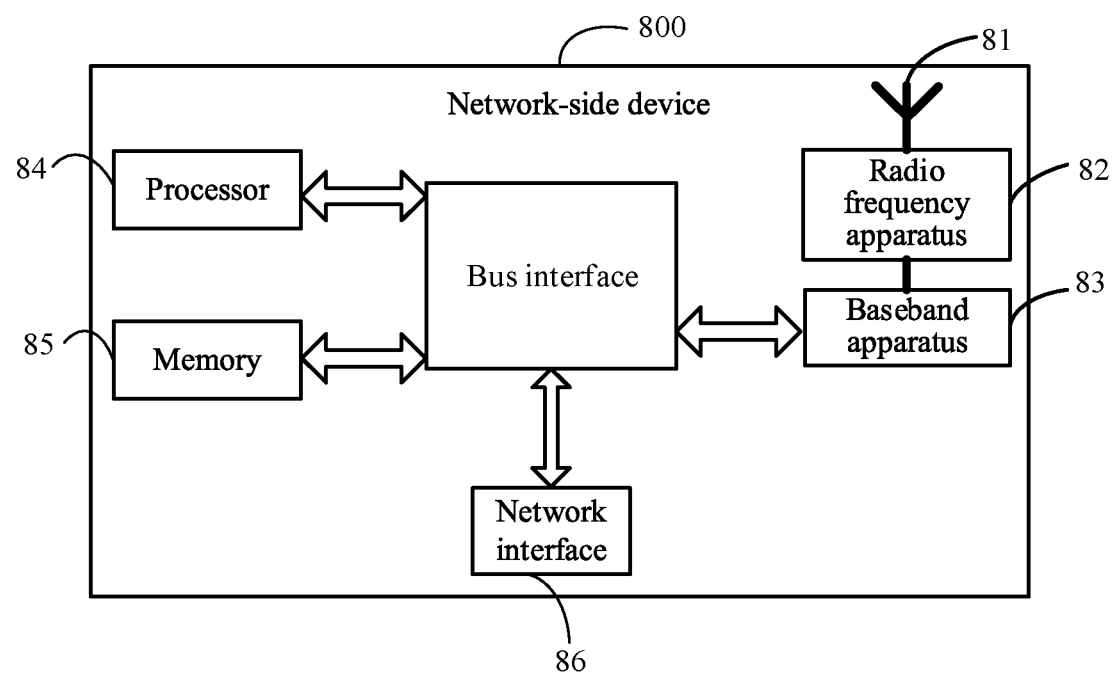
FIG. 10 is a schematic structural diagram of a network-side device according to an embodiment of this application.

Specifically, an embodiment of this application further provides a network-side device. As shown in FIG. 10, the network-side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and sends the received information to the baseband apparatus 83 for processing. In a downlink direction, the baseband apparatus 83 processes to-be-sent information, and sends the information to the radio frequency apparatus 82; and the radio frequency apparatus 82 processes the received information and then sends the information out by using the antenna 81.

The radio frequency apparatus may be located in the baseband apparatus 83. The method performed by the network-side device in the foregoing embodiment may be implemented in the baseband apparatus 83, and the baseband apparatus 83 includes a processor 84 and a memory 85. The baseband apparatus 83 may include, for example, at least one baseband processing unit, where a plurality of chips are disposed on the baseband processing unit. As shown in FIG. 10, one of the chips is, for example, the processor 84, connected to the memory 85, to invoke a program in the memory 85 to perform the operation of the network-side device shown in the foregoing method embodiment. The baseband apparatus 83 may further include a network interface 86, configured to exchange information with the radio frequency apparatus 82, where the interface is, for example, a common public radio interface (CPRI). Specifically, the network-side device in this embodiment of this application further includes a program or instructions stored in the memory 85 and capable of running on the processor 84. When the processor 84 invokes the program or instructions in the memory 85, the method performed by each module shown in FIG. 6 is performed, with the same technical effect achieved. To avoid repetition, details are not described herein again.

An embodiment of this application further provides a readable storage medium. The readable storage medium stores a program or instructions. When the program or instructions are executed by a processor, each process of the foregoing beam failure recovery method embodiment is implemented, with the same technical effect achieved. To avoid repetition, details are not described herein again. The processor is a processor in the terminal in the foregoing embodiment. The readable storage medium includes a computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions on a network-side device to implement each process of the foregoing beam failure recovery method embodiment, with the same technical effect achieved. To avoid repetition, details are not described herein again. It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network-side device, or the like) to perform the methods described in the embodiments of this application.

The embodiments of this application are described above with reference to the accompanying drawings. However, this application is not limited to the foregoing specific embodiments. The foregoing specific embodiments are merely illustrative rather than restrictive. Inspired by this application, a person of ordinary skill in the art can still derive a plurality of variations without departing from the essence of this application and the protection scope of the claims. All these variations shall fall within the protection scope of this application.

What is claimed is:

1. A beam failure recovery method, performed by a user equipment UE, wherein the method comprises:
    determining, based on a measurement result of a target reference signal corresponding to a target physical downlink control channel PDCCH, whether a beam failure event occurs, wherein the target PDCCH comprises at least a first PDCCH repeatedly transmitted for K times, and K≥2; and
    reporting a beam failure recovery request to a network-side device;
    wherein a reference signal resource set used for measurement comprises a first reference signal resource group corresponding to the first PDCCH;
    reference signal resources in the first reference signal resource group are:
    source RS resources indicated by transmission configuration indicator TCI state information used in each of the K transmissions of the first PDCCH;
    in a case that the first PDCCH is associated with one first control resource set CORESET and that the one first CORESET has a plurality of pieces of TCI state information, the source RS resources comprise a part or all of source RS resources indicated by each piece of TCI state information of the one first CORESET.

2. The method according to claim 1, wherein before the determining, based on a measurement result of a target reference signal corresponding to a target physical downlink control channel PDCCH, that a beam failure event occurs, the method further comprises:
    determining the reference signal resource set used for the measurement, wherein the reference signal resource set comprises a resource of the target reference signal.

3. The method according to claim 2, wherein the determining a reference signal resource set used for the measurement comprises:
    receiving indication information from the network-side device; and
    determining, based on the indication information, the reference signal resource set used for the measurement.

4. The method according to claim 2, wherein before the determining, based on a measurement result of a target reference signal corresponding to a target physical downlink control channel PDCCH, that a beam failure event occurs, the method further comprises:
    determining a measurement result of the first reference signal resource group.

5. The method according to claim 4, wherein the measurement result of the first reference signal resource group comprises at least one of the following:
    a measurement result of each reference signal resource in the first reference signal resource group;
    a joint measurement result obtained by combining measurement results of all of at least one first reference signal resource;
    a measurement result of each of at least one second reference signal resource; and
    a joint measurement result obtained by combining measurement results of all of at least one second reference signal resource, wherein
    the at least one first reference signal resource is at least one reference signal resource in the first reference signal resource group; and the at least one second reference signal resource is at least one reference signal resource in the first reference signal resource group, and each second reference signal resource corresponds to one or more pieces of TCI state information.

6. The method according to claim 5, wherein the first reference signal resource is a reference signal resource satisfying a second condition, wherein
    the second condition comprises all reference signal resources in the first reference signal resource group, or reference signal resources corresponding to same TRP identification information, in the first reference signal resource group.

7. The method according to claim 4, wherein before the reporting a beam failure recovery request to a network-side device, the method further comprises:
    in a case that the measurement result of the first reference signal resource group satisfies a first preset condition, determining that the beam failure event occurs.

8. The method according to claim 1, wherein reference signal resources in the first reference signal resource group satisfy at least one of the following:
    in a case that the K transmissions of the first PDCCH correspond to K reference signal resources in the first reference signal resource group, and each reference signal resource corresponds to one piece of TCI state information, K pieces of TCI state information corresponding to the K reference signal resources are in a one-to-one correspondence with and the same as K pieces of TCI state information in the K transmissions;

in a case that the K transmissions of the first PDCCH correspond to one reference signal resource in the first reference signal resource group, and the one reference signal resource corresponds to K pieces of TCI state information, the K pieces of TCI state information corresponding to the one reference signal resource are in a one-to-one correspondence with and the same as K pieces of TCI state information in the K transmissions; and in a case that the K transmissions of the first PDCCH correspond to at least one reference signal resource in the first reference signal resource group, and each of the at least one reference signal resource corresponds to at least one piece of TCI state information, all TCI state information corresponding to the at least one reference signal resource is in a one-to-one correspondence with and the same as K pieces of TCI state information in the K transmissions.

9. The method according to claim 8, wherein in a case that the first PDCCH is associated with N first CORESETs and that each first CORESET has one piece of TCI state information, the K pieces of TCI state information in the K transmissions comprise TCI state information of each first CORESET;

in a case that the first PDCCH is associated with one first CORESET and that the one first CORESET has a plurality of pieces of TCI state information, the K pieces of TCI state information in the K transmissions comprise each piece of TCI state information of the one first CORESET; or in a case that the first PDCCH is associated with N first CORESETs and that at least one of the N first CORESETs has a plurality of pieces of TCI state information, the K pieces of TCI state information in the K transmissions comprise each piece of TCI state information of each first CORESET, wherein N is an integer greater than 1.

10. The method according to claim 1, wherein the method further comprises:

in a case that the first PDCCH is associated with N first CORESETs and that each first CORESET has one piece of TCI state information, the source RS resources comprise a part or all of source RS resources indicated by TCI state information of each first CORESET; or in a case that the first PDCCH is associated with N first CORESETs and that at least one of the N first CORESETs has a plurality of pieces of TCI state information, the source RS resources comprise a part or all of source RS resources indicated by each piece of TCI state information of each first CORESET.

11. The method according to claim 1, wherein the target PDCCH further comprises a second PDCCH, and the second PDCCH is not repeatedly transmitted.

12. The method according to claim 1, wherein the beam failure recovery request comprises information of Y third reference signal resources, wherein the third reference signal resource is used for beam failure recovery; and the Y third reference signal resources are candidate beam reference signal resources satisfying a third condition, in X groups of candidate beam reference signal resources; and each group of candidate beam reference signal resources comprises at least one candidate beam reference signal resource, and Y is a positive integer.

13. A terminal device, wherein the terminal device comprises a processor, a memory, and a computer program or an instruction stored in the memory and capable of running on the processor, wherein when the processor executes the computer program or the instruction, the following steps are implemented:

determining, based on a measurement result of a target reference signal corresponding to a target physical downlink control channel PDCCH, whether a beam failure event occurs, wherein the target PDCCH comprises at least a first PDCCH repeatedly transmitted for K times, and K≥2; and reporting a beam failure recovery request to a network-side device;

wherein a reference signal resource set used for measurement comprises a first reference signal resource group corresponding to the first PDCCH;

reference signal resources in the first reference signal resource group are:

source RS resources indicated by transmission configuration indicator TCI state information used in each of the K transmissions of the first PDCCH;

in a case that the first PDCCH is associated with one first control resource set CORESET and that the one first CORESET has a plurality of pieces of TCI state information, the source RS resources comprise a part or all of source RS resources indicated by each piece of TCI state information of the one first CORESET.

14. The terminal device according to claim 13, wherein before the determining, based on a measurement result of a target reference signal corresponding to a target physical downlink control channel PDCCH, that a beam failure event occurs, when the processor executes the computer program or the instruction, the following steps are further implemented:

determining the reference signal resource set used for the measurement, wherein the reference signal resource set comprises a resource of the target reference signal.

15. The terminal device according to claim 13, wherein reference signal resources in the first reference signal resource group satisfy at least one of the following:

in a case that the K transmissions of the first PDCCH correspond to K reference signal resources in the first reference signal resource group, and each reference signal resource corresponds to one piece of TCI state information, K pieces of TCI state information corresponding to the K reference signal resources are in a one-to-one correspondence with and the same as K pieces of TCI state information in the K transmissions;

in a case that the K transmissions of the first PDCCH correspond to one reference signal resource in the first reference signal resource group, and the one reference signal resource corresponds to K pieces of TCI state information, the K pieces of TCI state information corresponding to the one reference signal resource are in a one-to-one correspondence with and the same as K pieces of TCI state information in the K transmissions; and in a case that the K transmissions of the first PDCCH correspond to at least one reference signal resource in the first reference signal resource group, and each of the at least one reference signal resource corresponds to at least one piece of TCI state information, all TCI state information corresponding to the at least one reference signal resource is in a one-to-one correspondence with and the same as K pieces of TCI state information in the K transmissions.

16. The terminal device according to claim 15, wherein
in a case that the first PDCCH is associated with N first CORESETs and that each first CORESET has one piece of TCI state information, the K pieces of TCI state information in the K transmissions comprise TCI state information of each first CORESET;
in a case that the first PDCCH is associated with one first CORESET and that the one first CORESET has a plurality of pieces of TCI state information, the K pieces of TCI state information in the K transmissions comprise each piece of TCI state information of the one first CORESET; or
in a case that the first PDCCH is associated with N first CORESETs and that at least one of the N first CORESETs has a plurality of pieces of TCI state information, the K pieces of TCI state information in the K transmissions comprise each piece of TCI state information of each first CORESET, wherein
N is an integer greater than 1.

17. A network-side device, wherein the network-side device comprises a processor, a memory, and a computer program or an instruction stored in the memory and capable of running on the processor, wherein when the processor executes the computer program or the instruction, the following steps are implemented:
sending indication information to user equipment UE, wherein the indication information indicates a reference signal resource set used for measurement, the reference signal resource set comprises a resource of a target reference signal corresponding to a target physical downlink control channel PDCCH, the target reference signal is used for beam failure detection, the target PDCCH comprises at least a first PDCCH repeatedly transmitted for K times, and K≥2; and
receiving a beam failure recovery request from the UE;
wherein the sending indication information to UE comprises:
sending the indication information to the UE according to a second predetermined rule;
wherein the reference signal resource set comprises a first reference signal resource group corresponding to the first PDCCH;
wherein reference signal resources in the first reference signal resource group are source RS resources indicated by transmission configuration indicator TCI state information used in each of the K transmissions of the first PDCCH;
wherein the second predetermined rule comprises:
in a case that the first PDCCH is associated with one first control resource set CORESET and that the one first CORESET has a plurality of pieces of TCI state information, the source RS resources comprise a part or all of source RS resources indicated by each piece of TCI state information of the one first CORESET.

* * * * *